US008741243B2

(12) United States Patent
Gadkaree et al.

(10) Patent No.: US 8,741,243 B2
(45) Date of Patent: Jun. 3, 2014

(54) SORBENT BODIES COMPRISING ACTIVATED CARBON, PROCESSES FOR MAKING THEM, AND THEIR USE

(75) Inventors: Kishor Purushottam Gadkaree, Painted Post, NY (US); Benedict Yorke Johnson, Horseheads, NY (US); Pei Qiong Kuang, Horseheads, NY (US); Anbo Liu, Panited Post, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 292 days.

(21) Appl. No.: 12/599,896

(22) PCT Filed: May 13, 2008

(86) PCT No.: PCT/US2008/006082
§ 371 (c)(1),
(2), (4) Date: Nov. 12, 2009

(87) PCT Pub. No.: WO2008/143831
PCT Pub. Date: Nov. 27, 2008

(65) Prior Publication Data
US 2011/0020202 A1 Jan. 27, 2011

Related U.S. Application Data

(63) Continuation-in-part of application No. 11/977,843, filed on Oct. 26, 2007, now Pat. No. 7,998,898.

(60) Provisional application No. 60/966,558, filed on May 14, 2007.

(51) Int. Cl.
*B01D 45/00* (2006.01)
*B01D 47/00* (2006.01)
*B01J 23/00* (2006.01)
*B01J 23/40* (2006.01)

(52) U.S. Cl.
USPC ........ 423/215.5; 423/210; 502/182; 502/184; 502/185

(58) Field of Classification Search
None
See application file for complete search history.

(56) References Cited

U.S. PATENT DOCUMENTS 4,305,827 A 12/1981 Sasaki
4,338,288 A 7/1982 Rollmann
(Continued)

FOREIGN PATENT DOCUMENTS

EP 0487370 B1 5/1992
EP 0 894 530 2/1999
(Continued)

OTHER PUBLICATIONS

DOE—National Energy Technology Laboratory, "In-House Research on Mercury Measurement and Control at NETL" Pittsburgh, PA. Nov. 2001.
(Continued)

*Primary Examiner* — Bijay Saha
(74) *Attorney, Agent, or Firm* — Joseph M. Homa

(57) ABSTRACT

Sorbent bodies comprising activated carbon, processes for making them, and methods of using them. The sorbent bodies can be used to remove toxic elements from a fluid, such as from a gas stream. For instance, the sorbent bodies may be used to remove elemental mercury or mercury in an oxidized state from a coal combustion flue gas.

22 Claims, 3 Drawing Sheets

(56) References Cited

U.S. PATENT DOCUMENTS

| | | | |
|---|---|---|---|
| 4,482,641 A | 11/1984 | Wennerberg | |
| 4,491,609 A | 1/1985 | Degel et al. | |
| 4,500,327 A | 2/1985 | Nishino et al. | |
| 4,518,704 A | 5/1985 | Okabayashi et al. | |
| 4,656,153 A | 4/1987 | Wennerberg | |
| 4,701,212 A | 10/1987 | Yan | |
| 4,708,853 A | 11/1987 | Matviya et al. | |
| 4,814,152 A | 3/1989 | Yan | |
| 4,831,003 A | 5/1989 | Lang et al. | |
| 4,889,698 A | 12/1989 | Moller et al. | 423/210 |
| 4,956,162 A | 9/1990 | Smith et al. | 423/244 |
| 4,970,189 A | 11/1990 | Tachibana | |
| 5,043,310 A | 8/1991 | Takeuchi et al. | |
| 5,245,106 A | 9/1993 | Cameron et al. | |
| 5,278,123 A | 1/1994 | Chopin et al. | |
| 5,288,306 A | 2/1994 | Aibe et al. | |
| 5,350,728 A | 9/1994 | Cameron et al. | |
| 5,403,548 A | 4/1995 | Aibe et al. | |
| 5,451,444 A | 9/1995 | DeLiso et al. | 3/12 |
| 5,487,917 A | 1/1996 | Gadkaree | 3/2 |
| 5,488,023 A | 1/1996 | Gadkaree et al. | 21/18 |
| 5,505,766 A | 4/1996 | Chang | 95/134 |
| 5,510,063 A | 4/1996 | Gadkaree et al. | 264/29.7 |
| 5,597,617 A | 1/1997 | DeLiso et al. | 3/2 |
| 5,601,701 A * | 2/1997 | Cameron et al. | 208/251 H |
| 5,685,986 A | 11/1997 | Yamada et al. | |
| 5,750,026 A | 5/1998 | Gadkaree et al. | 210/502.1 |
| 5,820,967 A | 10/1998 | Gadkaree | 428/116 |
| 5,820,969 A | 10/1998 | Satoh | 5/66 |
| 5,914,294 A | 6/1999 | Park et al. | |
| 5,950,423 A * | 9/1999 | Hampton | 60/274 |
| 5,998,328 A | 12/1999 | Dawes et al. | 21/18 |
| 6,024,899 A | 2/2000 | Peng et al. | 31/2 |
| 6,097,011 A | 8/2000 | Gadkaree et al. | 1/2 |
| 6,103,205 A | 8/2000 | Wojtowicz et al. | |
| 6,136,749 A * | 10/2000 | Gadkaree et al. | 502/183 |
| 6,149,820 A | 11/2000 | Pedersen | |
| 6,156,697 A | 12/2000 | Gadkaree | 20/20 |
| 6,187,713 B1 | 2/2001 | Gadkaree | 31/12 |
| 6,228,803 B1 | 5/2001 | Gadkaree | 31/8 |
| 6,248,691 B1 * | 6/2001 | Gadkaree et al. | 502/423 |
| 6,251,822 B1 | 6/2001 | Peng et al. | 31/8 |
| 6,258,334 B1 | 7/2001 | Gadkaree et al. | 423/210 |
| 6,328,939 B1 | 12/2001 | Amrhein | 423/210 |
| 6,372,289 B1 | 4/2002 | Hickman | 3/2 |
| 6,455,023 B1 | 9/2002 | Gadkaree et al. | |
| 6,472,343 B1 | 10/2002 | McCrae et al. | |
| 6,503,470 B1 | 1/2003 | Nolan et al. | 423/210 |
| 6,573,212 B2 | 6/2003 | McCrae et al. | |
| 6,579,507 B2 | 6/2003 | Pahlman et al. | 423/210 |
| 6,610,263 B2 | 8/2003 | Pahlman et al. | 423/210 |
| 6,682,667 B1 | 1/2004 | Matviya | |
| 6,696,384 B2 | 2/2004 | McCrae et al. | |
| 6,719,828 B1 | 4/2004 | Lovell et al. | |
| 6,787,494 B2 | 9/2004 | Tsuji et al. | |
| 6,790,420 B2 | 9/2004 | Breen et al. | 423/215.5 |
| 6,806,398 B2 * | 10/2004 | Sakai et al. | 585/836 |
| 6,914,034 B2 | 7/2005 | Vo | |
| 6,953,494 B2 | 10/2005 | Nelson, Jr. | |
| 7,017,757 B2 | 3/2006 | Wolff et al. | |
| 7,160,366 B2 | 1/2007 | Blackburn et al. | |
| 7,250,387 B2 | 7/2007 | Durante et al. | |
| 7,288,499 B1 | 10/2007 | Lovell et al. | |
| 7,297,175 B2 | 11/2007 | Miwa | 55/523 |
| 7,370,657 B2 | 5/2008 | Zhuang et al. | |
| 2002/0198097 A1* | 12/2002 | El-Shoubary et al. | 502/56 |
| 2003/0050711 A1 | 3/2003 | Laurencin et al. | 623/23.72 |
| 2003/0075484 A1 | 4/2003 | Sakai et al. | |
| 2003/0110744 A1* | 6/2003 | Gadkaree et al. | 55/523 |
| 2004/0074391 A1 | 4/2004 | Durante et al. | |
| 2005/0059549 A1 | 3/2005 | Vo | |
| 2005/0066817 A1 | 3/2005 | Wolff | |
| 2005/0093189 A1 | 5/2005 | Vo | |
| 2005/0100699 A1 | 5/2005 | Durante et al. | |
| 2005/0150835 A1 | 7/2005 | Vo | |
| 2005/0152821 A1 | 7/2005 | Durante et al. | |
| 2005/0155934 A1 | 7/2005 | Vo et al. | |
| 2005/0247635 A1 | 11/2005 | Vo et al. | |
| 2006/0045829 A1 | 3/2006 | Dodwell et al. | |
| 2006/0048646 A1 | 3/2006 | Olson et al. | |
| 2006/0051270 A1 | 3/2006 | Brunette | |
| 2006/0096926 A1 | 5/2006 | Mazyck et al. | 210/663 |
| 2006/0116287 A1 | 6/2006 | Durante et al. | |
| 2006/0178263 A1 | 8/2006 | Tatsuhara et al. | |
| 2006/0205592 A1 | 9/2006 | Chao et al. | |
| 2006/0229200 A1 | 10/2006 | Yao et al. | |
| 2006/0229476 A1 | 10/2006 | Mitchell, Sr. et al. | |
| 2007/0092418 A1 | 4/2007 | Mauldin et al. | |
| 2007/0104631 A1 | 5/2007 | Durante et al. | |
| 2007/0160517 A1 | 7/2007 | Fan et al. | |
| 2007/0179056 A1 | 8/2007 | Baek et al. | |
| 2007/0232488 A1 | 10/2007 | Akiyama et al. | |
| 2007/0234902 A1 | 10/2007 | Fair et al. | |
| 2007/0261557 A1 | 11/2007 | Gadkaree et al. | 96/121 |
| 2007/0264179 A1 | 11/2007 | Gadkaree et al. | 423/109 |
| 2007/0265161 A1 | 11/2007 | Gadkaree et al. | 502/417 |
| 2007/0292328 A1 | 12/2007 | Yang et al. | |
| 2008/0132408 A1 | 6/2008 | Mitchell et al. | |
| 2008/0207443 A1 | 8/2008 | Gadkaree et al. | 502/417 |

FOREIGN PATENT DOCUMENTS

| | | | |
|---|---|---|---|
| EP | 0894530 A1 * | 5/1999 | B01J 37/08 |
| GB | 2 122 916 | 1/1984 | |
| JP | 5146687 A | 6/1993 | |
| JP | 11-147707 | 6/1999 | |
| JP | 2000-218164 | 8/2000 | |
| JP | 2001-079346 | 3/2001 | |
| JP | 2001-240405 | 9/2001 | |
| JP | 2005-306710 | 11/2005 | |
| JP | 2007-117863 | 5/2007 | |
| WO | 2005/061099 A1 | 7/2005 | |
| WO | 2007/114849 A2 | 10/2007 | |
| WO | 2007/127652 A2 | 11/2007 | |
| WO | 2007/133487 | 11/2007 | |
| WO | 2007/133492 | 11/2007 | |
| WO | 2007/133568 | 11/2007 | |
| WO | 2007/133867 A2 | 11/2007 | |
| WO | 2007/141577 | 12/2007 | |
| WO | 2008/020250 | 2/2008 | |
| WO | 2008/106111 | 9/2008 | |
| WO | 2008/143831 | 11/2008 | |

OTHER PUBLICATIONS

DOE—National Energy Technology Laboratory, "DOE/NETL's Phase II Plans for Full-Scale Mercury Removal Technology Field-Testing", Presentation at 2000 Air Quality III conference Sep. 10, 2002 Arlington, VA.

National Academy of Sciences (NAS), National Research Council, "Toxicological effects of Methylmercury", National Academy Press, Washington, D.C., 2000.

Agency for Toxic Substances and Disease Registry (ATSDR), "Toxicological Profile for Mercury", Public Health Service, U.S. Department of Health and Human Services, Atlanta, GA. 1999.

DOE—Energy Information Administration, "Annual Energy Outlook 2004 with Projections to 2025", DOE/EIA-0383(2004), Jan. 2004.

EPA—Office of Air Quality Planning and Standards, Office of Research and Development, "Mercury Study Report to Congress", Dec. 1997.

Office Action dated Feb. 1, 1995, during prosecution of U.S. Appl. No. 08/289,434.

Office Action dated Jun. 1, 1995, during prosecution of U.S. Appl. No. 08/289,434.

Notice of Allowance dated Aug. 2, 1995, during prosecution of U.S. Appl. No. 08/289,434.

Office Action dated Mar. 25, 1998, during prosecution of U.S. Appl. No. 08/741,840.

(56) References Cited

OTHER PUBLICATIONS

Office Action dated Sep. 16, 1998, during prosecution of U.S. Appl. No. 08/741,840.
Advisory Action dated Dec. 21, 1998, during prosecution of U.S. Appl. No. 08/741,840.
Notice of Allowance dated Feb. 9, 2000, during prosecution of U.S. Appl. No. 09/116,183.
Office Action dated Mar. 22, 2000, during prosecution of U.S. Appl. No. 09/231,860.
Wilhelm; Generation and disposal of Petroleum Processing Waste that contains Mercury; Environmental Progress; pp. 130-143; 1999; vol. 18; No. 2.
Chinese Office Action Application No. 200880022413.2 dated Oct. 26, 2011.

\* cited by examiner

SORBENT BODIES COMPRISING ACTIVATED CARBON, PROCESSES FOR MAKING THEM, AND THEIR USE

This application is the US national stage filing of PCT/US2008/006082, which claims the benefit of priority to U.S. application Ser. No. 11/977,843, filed on Oct. 26, 2007, and to U.S. provisional application No. 60/966,558, filed on May 14, 2007.

FIELD OF THE DISCLOSURE

This disclosure relates to sorbent bodies comprising activated carbon, processes for making them, and methods of using them. The sorbent bodies can be used to remove toxic elements from a fluid, such as from a gas stream. For instance, the sorbent bodies may be used to remove elemental mercury or mercury in an oxidized state from a coal combustion flue gas.

BACKGROUND

Emissions of toxins into the atmosphere have become environmental issues of increasing concern because of the dangers posed to human health. For instance, coal-fired power plants and medical waste incineration are major sources of human activity related mercury emissions. Mercury emitted to the atmosphere can travel thousands of miles before being deposited to the earth. Studies also show that mercury from the atmosphere can also be deposited in areas near the emission source.

It is estimated that there are 48 tons of mercury emitted from coal-fired power plants in the United States annually. One DOE-Energy Information Administration annual energy outlook projected that coal consumption for electricity generation will increase from 976 million tons in 2002 to 1,477 million tons in 2025 as the utilization of coal-fired generation capacity increases. However, mercury emission control regulations have not been rigorously enforced for coal-fired power plants. A major reason is a lack of effective control technologies available at a reasonable cost, especially for elemental mercury control.

One technology that has been used for controlling elemental mercury, as well as for oxidized mercury, is activated carbon injection (ACI). The ACI process includes injecting activated carbon powder into the flue gas stream and using a fabric fiber or electrostatic precipitator to collect the activated carbon powder that has adsorbed mercury. Generally, ACI technologies require a high carbon to mercury ratio to achieve the desired mercury removal level (>90%), which results in a high cost for sorbent material. The high carbon to mercury ratio suggests that ACI does not utilize the mercury sorption capacity of carbon powder efficiently. Additionally, if only one particle collection system is used, the commercial value of fly ash is sacrificed due to its mixing with contaminated activated carbon powder. A system with two separate powder collectors and injecting activated carbon sorbent between the first collector for fly ash and the second collector, or a baghouse, for activated carbon powder, may be used. A baghouse with high collection efficiency may be installed in the power plant facilities. However, these measures are costly and may be impractical, especially for small power plants.

Since water-soluble (oxidized) mercury is the main mercury species in bituminous coal flue gas with high concentrations of $SO_2$ and HCl, bituminous coal-fired plants may be able to remove 90% mercury using a wet scrubber combined with $NO_x$ and/or $SO_2$ control technologies. Mercury emission control can also be achieved as a co-benefit of particulate emission control. Chelating agents may be added to a wet scrubber to sequestrate the mercury from emitting again. A chelating agent adds to the cost due to the problems of corrosion of the metal scrubber equipment and treatment of chelating solution. Elemental mercury is the dominant mercury species in the flue gas of sub-bituminous coal or lignite coal, and a wet scrubber is not effective for removal of elemental mercury unless additional chemicals are added to the system. It is undesirable, however, to add additional potentially environmentally hazardous material into the flue gas system.

Certain industrial gases, such as syngas and combustion flue gas, may contain toxic elements such as cadmium, chromium, lead, barium, beryllium, nickel, cobalt, vanadium, zinc, copper, manganese, antimony, silver, thallium, arsenic or selenium, in addition to mercury. Like mercury, these toxic elements may exist in elemental form or in a chemical compound comprising the element. It is highly desired that the presence of one or more of these toxic elements be substantially reduced before a syngas is supplied for industrial and/or residential use or before a gas is emitted to the atmosphere.

There is a genuine need of a sorbent material capable of removing mercury and/or other toxic elements from fluids such as flue gas and syngas, with a higher capacity than activated carbon powder alone. It is also desired that such sorbent material be produced at a reasonable cost and conveniently used.

SUMMARY

Embodiments of the invention relate to sorbent bodies comprising activated carbon, processes for making them, and methods of using them. The sorbent bodies can be used to remove toxic elements from a fluid, such as from a gas stream. For instance, the sorbent bodies may be used to remove elemental mercury or mercury in an oxidized state from a coal combustion flue gas.

Embodiments of the invention have one or more of the following advantages. Sorbent bodies of the invention comprising activated carbon having high specific surface area and a large number of active sites capable of sorbing or promoting sorption of a toxic element can be produced and used effectively for the sorption of toxic elements, including arsenic, cadmium, mercury and selenium. The sorbent bodies of certain embodiments of the invention are effective for sorption of not just oxidized mercury, but also elemental mercury. Further, the sorbent bodies according to certain embodiments of the invention are effective in removing mercury from flue gases with high and low concentrations of HCl alike. Sorbent bodies according to certain embodiments of the invention are also effective in removing mercury from flue gases with high concentration of $SO_3$.

Additional features and advantages will be set forth in the detailed description which follows, and in part will be readily apparent to those skilled in the art from the description or recognized by practicing the invention as described in the written description and claims hereof, as well as the appended drawings.

The foregoing general description and the following detailed description are merely exemplary of the invention, and are intended to provide an overview or framework to understanding the nature and character of the invention as it is claimed.

BRIEF DESCRIPTION OF THE DRAWINGS

The accompanying drawings are included to provide a further understanding of the invention, and are incorporated in and constitute a part of this specification.

DETAILED DESCRIPTION

Figure 1:
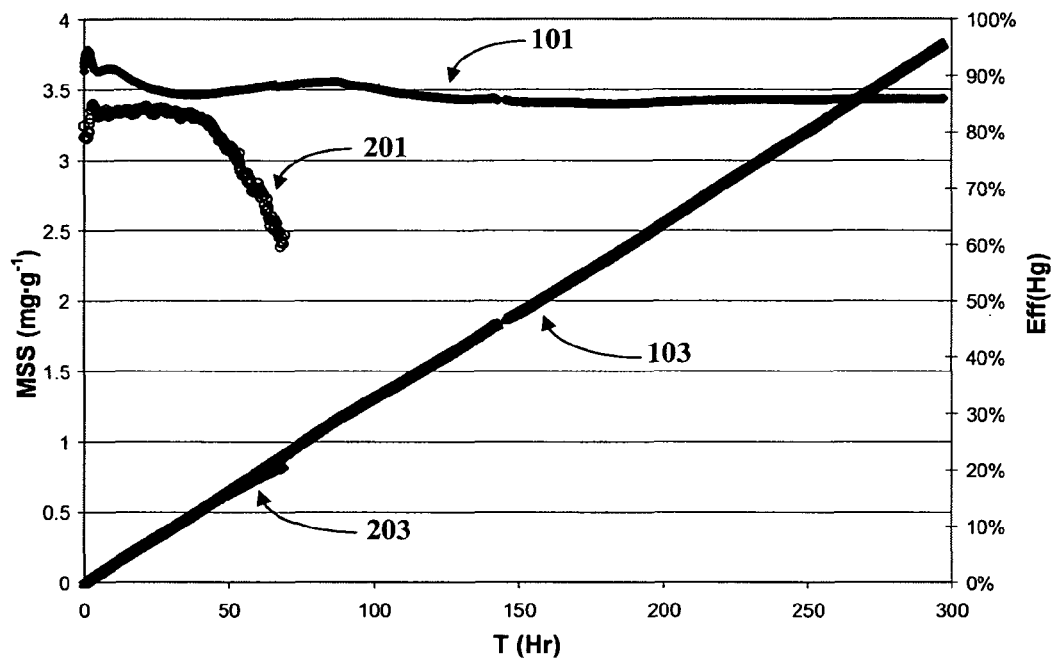
FIG. 1 is a diagram comparing the mercury removal capability of a tested sample of a sorbent comprising an in-situ extruded metal catalyst according to the invention and a sorbent which comprises impregnated metal but no in-situ extruded metal catalyst over time.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein the use of the indefinite article "a" or "an" means "at least one," and should not be limited to "only one" unless explicitly indicated to the contrary. Thus, for example, reference to "a metal catalyst" includes embodiments having one, two or more metal catalysts, unless the context clearly indicates otherwise.

As used herein, a "wt %" or "weight percent" or "percent by weight" of a component, unless specifically stated to the contrary, is based on the total weight of the composition or article in which the component is included. As used herein, all percentages are by weight unless indicated otherwise. All ppm with respect to gases are by volume unless indicated otherwise.

The term "sulfur" as used herein includes sulfur element at all oxidation states, including, inter alia, elemental sulfur (0), sulfate (+6), sulfite (+4), and sulfide (−2). The term sulfur thus includes sulfur in any oxidation state, as elemental sulfur or in a chemical compound or moiety comprising sulfur. The weight percent of sulfur is calculated on the basis of elemental sulfur, with any sulfur in other states converted to elemental state for the purpose of calculation of the total amount of sulfur in the material.

The term "metal catalyst" includes any metal element in any oxidation state, as elemental metal or in a chemical compound or moiety comprising the metal, which is in a form that promotes the removal of a toxic element (such as cadmium, mercury, chromium, lead, barium, beryllium, nickel, cobalt, vanadium, zinc, copper, manganese, antimony, silver, thallium, arsenic or selenium, or such as cadmium, mercury, arsenic or selenium) from a fluid in contact with a sorbent body of the invention. Metal elements can include alkali metals, alkaline earth metals, transition metals, rare earth metals (including lanthanoids), and other metals such as aluminum, gallium, indium, tin, lead, thallium and bismuth.

The weight percent of metal catalyst is calculated on the basis of elemental metal, with any metal in other states converted to elemental state for the purpose of calculation of the total amount of metal catalyst in the material. Metal elements present in an inert from, such as in an inorganic filler compound, are not considered metal catalysts and do not contribute to the weight percent of a metal catalyst. The amount of sulfur or metal catalyst may be determined using any appropriate analytical technique, such as mass spectroscopy.

By "in-situ extruded" is meant that the relevant material, such as sulfur and/or metal catalyst, is introduced into the material by incorporating at least part of the source material thereof into the batch mixture material, such that the formed body comprises the source materials incorporated therein.

Distribution of sulfur, metal catalyst or other materials across a cross-section of the sorbent body, or an extrusion batch mixture body, or a batch mixture material of the invention can be measured by various techniques, including, but not limited to, microprobe, XPS (X-ray photoelectron spectroscopy), and laser ablation combined with mass spectroscopy.

The methodology of characterizing the distribution of a certain material (e.g., sulfur, metal catalyst, and the like) in a certain planar cross-section of a sorbent body, or other body, is described as follows. This methodology is referred to as "Distribution Characterization Method."

Target test areas of the cross-section of at least 500 μm×500 μm size are chosen if the total cross-section is larger than 500 μm×500 μm. The full cross-section, if less than or equal to 500 μm×500 μm, would be a single target test area. The total number of target test areas is p (a positive integer).

Each target test area is divided by a grid into multiple separate 20 μm×20 μm zones. Only zones having an effective area (defined below) not less than 40 μm² are considered and those having an effective area lower than 40 μm² are discarded in the data processing below. Thus the total effective area (ATE) of all the square sample zones of the target test area is:

$$ATE = \sum_{i=1}^{n} ae(i),$$

where $ae(i)$ is the effective area of zone i, and n is the total number of the square sample zones in the target test area, where $ae(i) \geq 40$ μm². Area of individual square zone $ae(i)$ in square micrometers is calculated as follows:

$$ae(i) = 400 - av(i)$$

where $av(i)$ is the total area in square micrometers of any voids, pores or free space larger than 10 μm² within square zone i.

Each square zone i is measured to have an average concentration $C(i)$, expressed in terms of moles of sulfur atoms per unit effective area for sulfur, or moles of other relevant material in the case of a metal catalyst. All $C(i)$ (i=1 to n) are then listed in descending order to form a permutation CON(1), CON(2), CON(3), ... CON(n), where CON(1) is the highest $C(i)$ among all n zones, and CON(n) is the lowest $C(i)$ among all n zones. The arithmetic average concentration of the 5% of all n zones in the target test area having the highest concentrations is CON(max). Thus:

$$CON(\max) = \frac{\sum_{m=1}^{INT(0.05 \times n)} CON(m)}{INT(0.05 \times n)}.$$

where INT(0.05×n) is the smallest integer larger than or equal to 0.05×n. As used herein, the operator "INT(X)" yields the smallest integer larger than or equal to X.

The arithmetic average concentration of the 5% of all n zones in the target test area having the lowest concentrations is CON(min). Thus:

$$CON(\min) = \frac{\sum_{m=INT(0.95 \times n)}^{n} CON(m)}{n - INT(0.95 \times n)}.$$

The arithmetic average concentration of the target test area is CON(av). Thus:

$$CON(av) = \frac{\sum_{m=1}^{n} CON(m)}{n}.$$

For all p target test areas, all CON(av)(k) (k=1 to p) are then listed in descending order to form a permutation CONAV(1), CONAV(2), CONAV(3), ... CONAV(p), where CONAV(1) is the highest CON(av)(k) among all p target test areas, and CONAV(p) is the lowest CON(av)(p) among all p target test areas. The arithmetic average concentration of all p target test areas is CONAV(av). Thus:

$$CONAV(av) = \frac{\sum_{k=1}^{p} CONAV(k)}{p}.$$

In certain embodiments of the bodies or materials according to the invention, where the relevant material is distributed throughout the body, or the activated carbon matrix, or the material, it is desired that: in each target test area, the distribution thereof has the following feature: CON(av)/CON(min)≤30, and CON(max)/CON(av)≤30. In certain other embodiments, it is desired that CON(av)/CON(min)≤20, and CON(max)/CON(av)≤20. In certain other embodiments, it is desired that CON(av)/CON(min)≤15, and CON(max)/CON(av)≤15. In certain other embodiments, it is desired that CON(av)/CON(min)≤10, and CON(max)/CON(av)≤10. In certain other embodiments, it is desired that CON(av)/CON(min)≤5, and CON(max)/CON(av)≤5. In certain other embodiments, it is desired that CON(av)/CON(min)≤3, and CON(max)/CON(av)≤3. In certain other embodiments, it is desired that CON(av)/CON(min)≤2, and CON(max)/CON(av)≤2.

For a certain material or component to be "homogeneously distributed" to have a "homogeneous distribution" in a body or a material according to the present application, the distribution thereof according to the Distribution Characterization Method satisfies the following: in each target test area, for all CON(m) where 0.1n≤m≤0.9n: 0.5≤CON(m)/CON(av)≤2.

In certain embodiments, it is desired that 0.6≤CON(m)/CON(av)≤1.7. In certain embodiments, it is desired that 0.7≤CON(m)/CON(av)≤1.4. In certain other embodiments, it is desired that 0.8≤CON(m)/CON(av)≤1.2. In certain other embodiments, it is desired that 0.9≤CON(m)/CON(av)≤1.1. In certain embodiments, for all CON(m) where 0.05n≤m≤0.95n: 0.5≤CON(m)/CON(av)≤2; in certain embodiments, 0.6≤CON(m)/CON(av)≤1.7. In certain other embodiments, it is desired that 0.7≤CON(m)/CON(av)≤1.4. In certain other embodiments, it is desired that 0.8≤CON(m)/CON(av)≤1.2. In certain other embodiments, it is desired that 0.9≤CON(m)/CON(av)≤1.1. In certain embodiments of the invention (sorbent body, extrusion mixture body, and the like) and material of the invention, in addition to any one of the features stated above in this paragraph with respect to each individual target test area, the distribution of the relevant material (e.g., sulfur, metal catalyst, and the like) with respect to all p target test areas has the following feature: for all CONAV(k) where 0.1p≤k≤0.9p: 0.5≤CONAV(k)/CONAV(av)≤2; in certain embodiments, 0.6≤CONAV(k)/CONAV(av)≤1.7. In certain other embodiments, it is desired that 0.7≤CONAV(k)/CONAV(av)≤1.4. In certain other embodiments, it is desired that 0.8≤CONAV(k)/CONAV(av)≤1.2. In certain other embodiments, it is desired that 0.9≤CONAV(k)/CONAV(av)≤1.1. In certain other embodiments, it is desired that 0.95≤CONAV(k)/CONAV(av)≤1.05. In certain embodiments, for all CONAV(k) where 0.05p≤k≤0.95p: 0.5≤CONAV(k)/CONAV(av)≤2; in certain embodiments, 0.6≤CONAV(k)/CONAV(av)≤1.7. In certain other embodiments, it is desired that 0.7≤CONAV(k)/CONAV(av)≤1.4. In certain other embodiments, it is desired that 0.8≤CONAV(k)/CONAV(av)≤1.2. In certain other embodiments, it is desired that 0.9≤CONAV(k)/CONAV(av)≤1.1. In certain other embodiments, it is desired that 0.95≤CONAV(k)/CONAV(av)≤1.05.

One aspect of the invention is a sorbent body comprising:
an activated carbon matrix;
sulfur, in any oxidation state, as elemental sulfur or in a chemical compound or moiety comprising sulfur; and
a metal catalyst, in any oxidation state, as elemental metal or in a chemical compound or moiety comprising the metal;
wherein the metal catalyst is distributed throughout the activated carbon matrix.

In this and any other embodiments of sorbent bodies the invention, sulfur may be distributed throughout the activated carbon matrix. In some embodiments, the metal catalyst and/or sulfur is essentially homogeneously distributed throughout the activated carbon matrix. In some embodiments, at least a portion of the metal catalyst is chemically bound to at least a portion of the sulfur. Thus, one compound comprising a metal catalyst and sulfur, such as a metal sulfide, may provide both the sulfur and metal catalyst in the sorbent body. The phrase "at least a portion" of sulfur or metal catalyst refers to some or all of the sulfur or metal catalyst content in the sorbent body. In some further embodiments, at least a portion of sulfur is chemically bound to at least a portion of carbon in the activated carbon matrix.

In this and any other embodiments of sorbent bodies the invention, at least a portion of the sulfur, of the metal catalyst, or of both the sulfur and metal catalyst, is in a state capable of chemically bonding with cadmium, mercury, chromium, lead, barium, beryllium, nickel, cobalt, vanadium, zinc, copper, manganese, antimony, silver, thallium, arsenic or selenium. For instance, at least a portion of the sulfur can be in a state capable of chemically bonding with mercury.

The sorbent bodies of this and other embodiments described herein may, for example, be adapted for removing mercury and other toxic elements from a fluid stream such as a flue gas stream resulting from coal combustion or waste incineration or syngas produced during a coal gasification process. Such gas streams can contain various amounts of mercury and/or other toxic elements such as cadmium, chromium, lead, barium, beryllium, nickel, cobalt, vanadium, zinc, copper, manganese, antimony, silver, thallium, arsenic and selenium. Any toxic element, such as mercury, can be present in elemental state or oxidized state at various proportions in such gas streams depending on the source material (e.g., bituminous coal, sub-bituminous coal, municipal waste, and medical waste) and process conditions. In some embodiments, the sorbent body comprises a metal catalyst adapted for promoting the removal of arsenic, cadmium, mercury and/or selenium from a fluid stream to be treated.

It is believed that, by a combination of a physical and chemical sorption, the sorbent bodies of the invention are capable of binding and trapping mercury and other toxic elements both at elemental state and oxidized state. The sorbent bodies and material of certain embodiments of the invention are particularly effective for removing mercury at elemental state in a flue gas stream. This is particularly advantageous compared to certain other technology that is usually less effective in removing elemental mercury.

The sorbent bodies of the invention may take various shapes. For example, the sorbent body may be a powder, pellets, and/or extruded monolith. The sorbent bodies of the invention may be incorporated in a fixed sorbent bed through which a fluid stream to be treated may flow. In certain embodiments, especially when used in treating the coal combustion flue gas in power plants or the syngas produced in coal gasification processes, it is highly desired that any fixed bed through which the gas stream passes has a low pressure-drop. To that end, it is desired that sorbent pellets packed in the fixed bed allow for sufficient gas passageways.

According to certain embodiments, the sorbent body is in the form of a monolith. According to certain embodiments, the sorbent body is in the form of a monolithic honeycomb with a plurality of channels through which gas or liquid may pass.

In certain embodiments, it is particularly advantageous that the sorbent body of the invention is in the form of extruded monolithic honeycomb having multiple channels. Cell density of the honeycomb can be adjusted during the extrusion process to achieve various degree of pressure-drop when in use. Cell density of the honeycomb can range from 25 to 500 cells·inch$^{-2}$ (3.88 to 77.5 cells·cm$^{-2}$) in certain embodiments, from 50 to 200 cells·inch$^{-2}$ (7.75 to 31.0 cells·cm$^{-2}$) in certain other embodiments, and from 50 to 100 cells·inch$^{-2}$ (7.75 to 15.5 cells·cm$^{-2}$) in certain other embodiments. In certain embodiments, the thickness of the cell walls ranges from 1 mil to 50 mil, for example from 10 mil to 30 mil. To allow for a more intimate contact between the gas stream and the sorbent body material, it is desired in certain embodiments that part of the channels are plugged at one end of the sorbent body, and part of the channels are plugged at the other end of the sorbent body. In certain embodiments, it is desired that at each end of the sorbent body, the plugged and/or unplugged channels form a checkerboard pattern. In certain embodiments, it is desired that where one channel is plugged on one end (referred to as "the reference end") but not the opposite end of the sorbent body, at least a majority of the channels (preferably all in certain other embodiments) immediately proximate thereto (those sharing at least one wall with the channel of concern) are plugged at the other end of the sorbent body but not on the reference end. Multiple honeycombs can be stacked in various manners to form actual sorbent beds having various sizes, service duration, and the like, to meet the needs of differing use conditions.

The "activated carbon matrix," as used herein, means a network formed by interconnected carbon atoms and/or particles. In some embodiments, the activated carbon matrix in the sorbent bodies of the invention is in the form of an uninterrupted and continuous body. As is typical for activated carbon materials, the matrix comprises wall structure defining a plurality of pores. The activated carbon matrix, along with sulfur and the metal catalyst, can provide the backbone structure of the sorbent body. In addition, the large cumulative areas of the pores in the activated carbon matrix provide a plurality of sites where mercury sorption can occur directly, or where sulfur and the metal catalyst can be distributed, which further promote mercury sorption. It is to be noted that the pores defined by the activated carbon matrix can be different from the pores actually present in the sorbent body. For example, a portion of the pores defined by the activated carbon matrix may be filled by a metal catalyst, sulfur, an inorganic filler, and combinations and mixtures thereof.

In certain embodiments, the sorbent body comprises from 50% to 97% by weight of activated carbon, in certain embodiments from 60% to 97% or from 85% to 97%. In other embodiments, the sorbent body comprises at least 50% by weight of activated carbon, for example at least 60% by weight, at least 70% by weight, at least 80% by weight, at least 90% by weight, at least 95% by weight, or at least 97% by weight of activated carbon. Higher concentrations of activated carbon usually lead to higher porosity if the same level of carbonization and activation were used during the process of making the sorbent body when made according to the processes described herein.

The pores defined by the activated carbon matrix can be divided into two categories: nanoscale pores having a diameter of less than or equal to 10 nm, and microscale pores having a diameter of higher than 10 nm. According to certain embodiments, the activated carbon matrix defines a plurality of nanoscale pores. The metal catalyst or sulfur may, for example, be present on the wall surface of at least part of the nanoscale pores. According to certain embodiments, the activated carbon matrix further defines a plurality of microscale pores.

Pore size and distribution thereof in the sorbent bodies can be measured by using techniques available in the art, such as, e.g., nitrogen adsorption. Both the surfaces of the nanoscale pores and the microscale pores together provide the overall high specific area of the sorbent body of the invention. In certain embodiments, the wall surfaces of the nanoscale pores constitute at least 50%, at least 60%, at least 70%, at least 80%, or at least 90% of the specific area of the sorbent body.

The sorbent bodies of the invention may have large specific surface areas. In certain embodiments of the invention, the sorbent bodies have specific areas ranging from 50 to 2000 m$^2$·g$^{-1}$, 200 to 2000 m$^2$·g$^{-1}$, 400 to 1500 m$^2$·g$^{-1}$, 100 to 1800 m$^2$·g$^{-1}$, 200 to 1500 m$^2$·g$^{-1}$, or 300 to 1200 m$^2$·g$^{-1}$. Higher specific area of the sorbent body can provide more active sites in the material for the sorption of toxic elements. However, if the specific area of the sorbent body is quite high, e.g., higher than 2000 m$^2$·g$^{-1}$, the sorbent body becomes quite porous and the mechanical integrity of the sorbent body may suffer. This could be undesirable for certain applications where the strength of the sorbent body may need to meet certain threshold requirements.

The metal catalyst included within embodiments of the invention may promote the removal of one or more toxic elements such as cadmium, mercury, chromium, lead, barium, beryllium, nickel, cobalt, vanadium, zinc, copper, manganese, antimony, silver, thallium, arsenic or selenium from a fluid in contact with the sorbent body, any of which may be in any oxidation state and may be in elemental form or in a chemical compound comprising the element. Any such metal catalyst capable of promoting the removal of toxic elements or compounds (also referred to herein as "abatement" of toxic elements or compounds), including mercury, arsenic, cadmium or selenium, from a fluid, such as a fluid stream to be treated upon contacting, can be included in the sorbent body of the invention. The terms "removal" and "abatement" in this context are used interchangeably herein. Furthermore, those terms would be understood as covering reducing the presence of the toxic elements by a matter of degree in a fluid, i.e. by a certain percentage, and are not limited to complete removal or abatement of the toxic elements. In some embodiments, the metal catalyst can function in one or more of the following ways to promote the removal (or abatement) of toxic elements from a fluid in contact with the sorbent body: (i) temporary or permanent chemical sorption (e.g., via covalent and/or ionic bonds) of a toxic element; (ii) temporary or permanent physical sorption of a toxic element; (iii) catalyzing the reaction/sorption of a toxic element with other components of the sorbent body; (iv) catalyzing the reaction of a toxic element with the ambient atmosphere to convert it from one form to another; (v) trapping a toxic element already sorbed by other components of the sorbent body; and (vi) facilitating the transfer of a toxic element to the active sorbing sites.

According to certain embodiments of the sorbent body of the invention, the metal catalyst is provided in a form selected from: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; and (iv) combinations and mixtures of two or more of (i), (ii) and (iii).

For instance, the metal catalyst may be provided in a form selected from: (i) oxides, sulfides and salts of manganese; (ii) oxides, sulfides and salts of iron; (iii) combinations of (i) and KI; (iv) combinations of (ii) and KI; and (v) mixtures and combinations of any two or more of (i), (ii), (iii) and (iv). According to certain embodiments of the invention, the sorbent body comprises an alkaline earth metal hydroxide as a metal for promoting the removal of toxic elements, such as $Ca(OH)_2$.

Precious metals (Ru, Th, Pd, Ag, Re, Os, Ir, Pt and Au) and transition metals and compounds thereof are exemplary metal catalysts. Further non-limiting metal catalysts include alkali and alkaline earth halides, hydroxides or oxides; and oxides, sulfides, and salts of vanadium, chromium, manganese, iron, cobalt, nickel, copper, zinc, niobium, molybdenum, silver, tungsten, and lanthanoids. The metal catalysts can exist at any valency. For example, if iron is present, it may be present at +3, +2 or 0 valencies or as mixtures of differing valencies, and can be present as metallic iron (0), FeO, $Fe_2O_3$, $Fe_3O_8$, FeS, $FeCl_2$, $FeCl_3$, $FeSO_4$, and the like. For another example, if manganese is present, it may be present at +4, +2 or 0 valencies or as mixtures of differing valencies, and can be present as metallic manganese (0), MnO, $MnO_2$, MnS, $MnCl_2$, $MnCl_4$, $MnSO_4$, and the like. In some embodiments, the metal catalyst is not in the form of an oxide. In other embodiments, the sorbent body comprises at least one metal catalyst that is not in the form of an oxide.

In certain embodiments of the sorbent body of the invention, the metal catalyst is in a form selected from: alkali halides; and oxides, sulfides and salts of manganese and iron. In certain embodiments of the sorbent bodies of the invention, the metal catalyst is in a form selected from: combination of KI and oxides, sulfides and salts of manganese; combination of KI and oxides, sulfides and salts of iron; or a combination of KI, oxides, sulfides and salts of manganese and iron. These combinations are found to be particularly effective in removing mercury, especially elemental mercury from a gas stream.

According to certain embodiments of the invention, the sorbent body comprises an alkaline earth metal hydroxide as a metal for promoting the removal of toxic elements, such as $Ca(OH)_2$. Experiments have shown that $Ca(OH)_2$ can be particularly effective in promoting the removal of arsenic, cadmium and selenium from a gas stream.

In some embodiments of the invention, the metal catalyst is an alkali metal such as lithium, sodium, or potassium. In other embodiments, the metal catalyst is an alkaline earth metal such as magnesium, calcium, or barium. In other embodiments, the metal catalyst is a transition metal, such as palladium, platinum, silver, gold, manganese, or iron. In other embodiments, the metal catalyst is a rare earth metal such as cerium. In some embodiments, the metal catalyst is in elemental form. In other embodiments, the metal catalyst is a metal sulfide. In other embodiments, the metal catalyst is a transition metal sulfide or oxide. In yet other embodiments, the sorbent body comprises at least on catalyst other than an alkali metal, an alkaline earth metal, or transition metal. In other embodiments, the sorbent body comprises at least one catalyst other than sodium, other than potassium, other than magnesium, other than calcium, other than aluminum, other than titanium, other than zirconium, other than chromium, other than magnesium, other than iron and/or other than zinc. In other embodiments, the sorbent body comprises at least one metal catalyst other than aluminum, vanadium, iron, cobalt, nickel, copper, or zinc, either in elemental form or as sulfates.

The amount of the metal catalyst present in the sorbent bodies can be selected, depending on the particular metal catalyst used, and application for which the sorbent bodies are used, and the desired toxic element removing capacity and efficiency of the sorbent body. In certain embodiments of the sorbent bodies of the invention, the amount of the metal catalyst ranges from 1% to 20% by weight, in certain other embodiments from 2% to 18%, in certain other embodiments from 5% to 15%, in certain other embodiments from 5% to 10%. In yet further embodiments, the sorbent body comprises from 1% to 25% by weight of the metal catalyst (in certain embodiments from 1% to 20%, from 1% to 15%, from 3% to 10%, or from 3 to 5%).

If only one metal catalyst is present in a sorbent body in certain embodiments that recite a certain distribution of the metal catalyst in the activated carbon matrix, the metal catalyst is distributed throughout the activated carbon matrix. If multiple metal catalysts are present in these embodiments, at least one of them is distributed throughout the activated carbon matrix. By "distributed throughout the activated carbon matrix" is meant that the relevant specified material (metal catalyst, sulfur, and the like) is present not just on the external surface of the sorbent body or cell walls, but also deep inside the sorbent body. Thus the presence of the specific metal catalyst can be, e.g.: (i) on the wall surfaces of nanoscale pores defined by the activated carbon matrix; (ii) on the wall surfaces of microscale pores defined by the activated carbon matrix; (iii) submerged in the wall structure of the activated carbon matrix; (iv) partly embedded in the wall structure of the activated carbon matrix; (v) partly fill and/or block some pores defined by the activated carbon matrix; and (vi) completely fill and/or block some pores defined by the activated carbon matrix. In situations (iii), (iv), (v) and (vi), the metal catalyst(s) and/or other components distributed in the activated carbon matrix actually forms part of the wall structure of the pores of the sorbent body. In certain embodiments, multiple metal catalysts are present and all of them are distributed throughout the activated carbon matrix. However, it is not required that all metal catalysts are distributed throughout the activated carbon matrix. Thus, in certain embodiments, multiple metal catalysts are present, with at least one of them distributed throughout the activated carbon matrix, and at least one of them distributed essentially mainly on the external surface area and/or cell wall surface of the sorbent body, and/or within a thin layer beneath the external surface area and/or cell wall surface. In certain embodiments, at least a portion of the metal catalysts may be chemically bonded with other components of the sorbent body, such as carbon or the sulfur. In certain other embodiments, at least a portion of the metal catalysts may be physically bonded with the activated carbon matrix or other components. Still in certain other embodiments, at least a portion of the metal catalyst is present in the sorbent body in the form of particles having nanoscale or microscale size.

Distribution of a metal catalyst in the sorbent body or other body or material according to the invention can be measured and characterized by the Distribution Characterization Method described supra. In certain embodiments of the sorbent body of the invention, the distribution of a metal catalyst has the following feature: in each target test area: $CON(av)/CON(min) \leq 30$, and $CON(max)/CON(av) \leq 30$. In certain other embodiments, it is desired that $CON(av)/CON(min) \leq 20$, and $CON(max)/CON(av) \leq 20$. In certain other embodiments, it is desired that $CON(av)/CON(min) \leq 15$, and $CON(max)/CON(av) \leq 15$. In certain other embodiments, it is desired that $CON(av)/CON(min) \leq 10$, and $CON(max)/CON(av) \leq 10$. In certain other embodiments, it is desired that $CON(av)/CON(min) \leq 5$, and $CON(max)/CON(av) \leq 5$. In certain other embodiments, it is desired that $CON(av)/CON(min) \leq 3$, and $CON(max)/CON(av) \leq 3$. In certain other embodiments, it is desired that $CON(av)/CON(min) \leq 2$, and $CON(max)/CON(av) \leq 2$.

In certain embodiments of the sorbent body of the invention, at least one metal catalyst is homogeneously distributed throughout the activated carbon matrix according to the Distribution Characterization Method described supra. Thus: in each target test area, for all $CON(m)$ where $0.1n \leq m \leq 0.9n$: $0.5 \leq CON(m)/CON(av) \leq 2$.

In certain embodiments, it is desired that $0.6 \leq CON(m)/CON(av) \leq 1.7$. In certain embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments, for all $CON(m)$ where $0.05n \leq m \leq 0.95n$: $0.5 \leq CON(m)/CON(av) \leq 2$; in certain embodiments, $0.6 \leq CON(m)/CON(av) \leq 1.7$. In certain other embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments of the bodies (sorbent body, extrusion mixture body, and the like) and material of the invention, in addition to any one of the features stated above in this paragraph with respect to each individual target test area, the distribution of the relevant material (e.g., sulfur, metal catalyst, and the like) with respect to all p target test areas has the following feature: for all $CONAV(k)$ where $0.1p \leq k \leq 0.9p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$. In certain embodiments, for all $CONAV(k)$ where $0.05p \leq k \leq 0.95p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$.

In certain embodiments of the invention, the metal catalyst is present on a majority of the wall surfaces of the microscale pores. In certain other embodiments of the invention, the metal catalyst is present on at least 75%, at least 90% or at least 95% of the wall surfaces of the microscale pores.

In certain embodiments of the invention, the metal catalyst is present on at least 20%, at least 40%, at least 50%, at least 75%, or at least 85% of the wall surfaces of the nanoscale pores. In certain embodiments, a majority of the specific area of the sorbent body is provided by the wall surfaces of the nanoscale pores. In these embodiments, it is desired that a higher percentage of the wall surface of the nanoscale pores has the metal catalyst distributed thereon.

The sorbent bodies of the invention comprise sulfur. The amount of sulfur present in the sorbent bodies can be selected depending on the particular metal catalyst used, and application for which the sorbent bodies are used, and the desired toxic element removing capacity and efficiency of sorbent body.

In some embodiments, the sorbent body comprises from 1% to 20% by weight of sulfur (in certain embodiments from 1% to 15%, from 3% to 8%, from 2% to 10%, from 0.1 to 5%, or from 2 to 5%). Sulfur may be present in the form of elemental sulfur (0 valency), sulfides (−2 valency, e.g.), sulfite (+4 valency, e.g.), sulfate (+6 valency, e.g.). In some embodiments, sulfur is not present as a sulfate, or, a sulfate is not the only source of sulfur in the sorbent body. It is desired that at least part of the sulfur is present in a valency capable of chemically bonding with the toxic element to be removed from a fluid stream, such as with mercury. To that end, it is desired that at least part of the sulfur is present at −2 and/or zero valency. At least a portion of the sulfur may be chemically or physically bonded to the wall surface of the activated carbon matrix. At least a portion of the sulfur may be chemically or physically bonded to the metal catalyst, as indicated supra, e.g., in the form of a sulfide (FeS, MnS, $Mo_2S_3$, CuS and the like).

In some embodiments, at least a portion of the sulfur is at zero valency. For instance, at least 10% of the sulfur on the surface of the walls of the pores of the activated carbon matrix may be essentially at zero valency when measured by XPS. In other embodiments at least a portion of the sulfur is not at zero valency. In some embodiments, the sorbent bodies comprise a portion of sulfur at zero valency and a portion of sulfur not at zero valency. In some embodiments, the sorbent bodies comprise elemental sulfur as well as sulfur present in chemical compound comprising sulfur, such as a metal sulfide.

In certain embodiments, it is desired that at least 40%, at least 50%, at least 60%, or at least 70% by mole of the sulfur in the sorbent body be at zero valency. According to certain embodiments, at least 10%, at least 20%, at least 30%, at least 40%, at least 50% or at least 60% of the sulfur on the surface of the walls of the pores is essentially at zero valency, when measured by XPS.

Experiments have demonstrated that sorbent bodies of activated carbon, sulfur and metal catalyst can be effective for removing arsenic, cadmium as well as selenium, in addition to mercury, from a gas stream. Experiments have demonstrated that sorbent bodies comprising elemental sulfur tend to have higher mercury removal capability than those without elemental sulfur but with essentially the same total sulfur concentration.

In certain embodiments, sulfur is distributed throughout the activated carbon matrix. By "distributed throughout the activated carbon matrix" is meant that sulfur is present not just on the external surface of the sorbent body or cell walls, but also deep inside the sorbent body. Thus the presence of sulfur can be, e.g.: (i) on the wall surfaces of nanoscale pores; (ii) on the wall surfaces of microscale pores; (iii) submerged in the wall structure of the activated carbon matrix; and (iv) partly embedded in the wall structure of the activated carbon matrix. In situations (iii) and (iv), sulfur actually forms part of the wall structure of the pores of the sorbent body. Therefore, in certain embodiments, some of sulfur may be chemically bonded (covalently and/or ionically) with other components of the sorbent body, such as carbon or the metal catalyst. In certain other embodiments, some of the sulfur may be physically bonded with the activated carbon matrix or other components. Still in certain other embodiments, some of the sulfur is present in the sorbent body in the form of particles having nanoscale or microscale size.

Distribution of sulfur in the sorbent body or other body or material according to the present invention can be measured and characterized by the Distribution Characterization Method described supra.

In certain embodiments, the distribution of sulfur in any target test area has the following feature: CON(max)/CON(min)≥100. In certain other embodiments: CON(max)/CON(min)≥200. In certain other embodiments: CON(max)/CON(min)≥300. In certain other embodiments: CON(max)/CON(min)≥400. In certain other embodiments: CON(max)/CON(min)≥500. In certain other embodiments: CON(max)/CON(min)≥1000. In certain other embodiments: CON(max)/CON(av)≥50. In certain other embodiments: CON(max)/CON(av)≥100. In certain other embodiments: CON(max)/CON(av)≥200. In certain other embodiments: CON(max)/CON(av)≥300. In certain other embodiments: CON(max)/CON(av)≥400. In certain other embodiments: CON(max)/CON(av)≥500. In certain other embodiments: CON(max)/CON(av)≥1000.

In certain embodiments, with regard to sulfur distributed in the sorbent body, the distribution thereof in all p target test areas has the following feature: CONAV(1)/CONAV(n)≥2. In certain other embodiments: CONAV(1)/CONAV(n)≥5. In certain other embodiments: CONAV(1)/CONAV(n)≥8. In certain other embodiments: CONAV(1)/CONAV(n)≥1.5. In certain other embodiments: CONAV(1)/CONAV(av)≥2. In certain other embodiments: CONAV(1)/CONAV(av)≥3. In certain other embodiments: CONAV(1)/CONAV(av)≥4. In certain other embodiments: CONAV(1)/CONAV(av)≥5. In certain other embodiments: CONAV(1)/CONAV(av)≥8. In certain other embodiments: CONAV(1)/CONAV(av)≥10.

In certain other embodiments, with regard to sulfur distributed in the sorbent body, in each target test area, the distribution thereof has the following feature: CON(av)/CON(min)≤30. In certain other embodiments: CON(av)/CON(min)≤20. In certain other embodiments: CON(av)/CON(min)≤15. In certain other embodiments: CON(av)/CON(min)≤10. In certain other embodiments: CON(av)/CON(min)≤5. In certain other embodiments: CON(av)/CON(min)≤3. In certain other embodiments: CON(av)/CON(min)≤2. In certain other embodiments: CON(max)/CON(av)≤30. In certain other embodiments: CON(max)/CON(av)≤20. In certain other embodiments: CON(max)/CON(av)≤15. In certain other embodiments: CON(max)/CON(av)≤10. In certain other embodiments: CON(max)/CON(av)≤5. In certain other embodiments: CON(max)/CON(av)≤3. In certain other embodiments: CON(max)/CON(av)≤2.

In certain embodiments of the sorbent body of the present invention, the distribution of sulfur has the following feature: in each target test area, CON(av)/CON(min)≤30, and CON(max)/CON(av)≤30. In certain other embodiments, it is desired that CON(av)/CON(min)≤20, and CON(max)/CON(av)≤20. In certain other embodiments, it is desired that CON(av)/CON(min)≤15, and CON(max)/CON(av)≤15. In certain other embodiments, it is desired that CON(av)/CON(min)≤10, and CON(max)/CON(av)≤10. In certain other embodiments, it is desired that CON(av)/CON(min)≤5, and CON(max)/CON(av)≤5. In certain other embodiments, it is desired that CON(av)/CON(min)≤3, and CON(max)/CON(av)≤3. In certain other embodiments, it is desired that CON(av)/CON(min)≤2, and CON(max)/CON(av)≤2.

In certain embodiments of the sorbent body of the present invention, sulfur is homogeneously distributed throughout the activated carbon matrix according to the Distribution Characterization Method described supra. Thus: in each target test area, for all CON(m) where 0.1n≤m≤0.9n: 0.5≤CON(m)/CON(av)≤2.

In certain embodiments, it is desired that 0.6≤CON(m)/CON(av)≤1.7. In certain other embodiments, it is desired that 0.7≤CON(m)/CON(av)≤1.4. In certain other embodiments, it is desired that 0.8≤CON(m)/CON(av)≤1.2. In certain other embodiments, it is desired that 0.9≤CON(m)/CON(av)≤1.1. In certain embodiments, for all CON(m) where 0.05n≤m≤0.95n: 0.5≤CON(m)/CON(av)≤2; in certain embodiments, 0.6≤CON(m)/CON(av)≤1.7. In certain other embodiments, it is desired that 0.7≤CON(m)/CON(av)≤1.4. In certain other embodiments, it is desired that 0.8≤CON(m)/CON(av)≤1.2. In certain other embodiments, it is desired that 0.9≤CON(m)/CON(av)≤1.1. In certain embodiments of the bodies (sorbent body, extrusion mixture body, and the like) and material of the present invention, in addition to any one of the features stated above in this paragraph with respect to each individual target test area, the distribution of the relevant material (e.g., sulfur, metal catalyst, and the like) with respect to all p target test areas has the following feature: for all CONAV(k) where 0.1p≤k≤0.9p: 0.5≤CONAV(k)/CONAV(av)≤2; in certain embodiments, 0.6≤CONAV(k)/CONAV(av)≤1.7. In certain other embodiments, it is desired that 0.7≤CONAV(k)/CONAV(av)≤1.4. In certain other embodiments, it is desired that 0.8≤CONAV(k)/CONAV(av)≤1.2. In certain other embodiments, it is desired that 0.9≤CONAV(k)/CONAV(av)≤1.1. In certain other embodiments, it is desired that 0.95≤CONAV(k)/CONAV(av)≤1.05. In certain embodiments, for all CONAV(k) where 0.05p≤k≤0.95p: 0.5≤CONAV(k)/CONAV(av)≤2; in certain embodiments, 0.6≤CONAV(k)/CONAV(av)≤1.7. In certain other embodiments, it is desired that 0.7≤CONAV(k)/CONAV(av)≤1.4. In certain other embodiments, it is desired that 0.8≤CONAV(k)/CONAV(av)≤1.2. In certain other embodiments, it is desired that 0.9≤CONAV(k)/CONAV(av)≤1.1. In certain other embodiments, it is desired that 0.95≤CONAV(k)/CONAV(av)≤1.05.

In certain embodiments, sulfur is present on a majority of the wall surfaces of the microscale pores. In certain other embodiments, sulfur is present on at least 75%, at least 90%, or at least 95% of the wall surfaces of the microscale pores.

In certain embodiments, sulfur is present on at least 20%, at least 30%, at least 40%, at least 50%, at least 75%, or at least 85% of the wall surfaces of the nanoscale pores. In certain embodiments, a majority of the specific area of the sorbent body is provided by the wall surfaces of the nanoscale pores. In these embodiments, it is desired that a high percentage (such as at least 40%, at least 50%, or at least 60%) of the wall surface of the nanoscale pores has sulfur distributed thereon.

The sorbent body may further comprise inorganic filler material. In contrast to the metal catalyst, any metal element in the inorganic filler material is chemically and physically inert. As such, the metal element included in the inorganic filler does not function in one or more of the following ways to promote the removal of the toxic elements from a fluid in contact with a sorbent body of the invention: (i) temporary or permanent chemical sorption (e.g., via covalent and/or ionic bonds) of a toxic element; (ii) temporary or permanent physical sorption of a toxic element; (iii) catalyzing the reaction/sorption of a toxic element with other components of the sorbent body; (iv) catalyzing the reaction of a toxic element with the ambient atmosphere to convert it from one form to another; (v) trapping a toxic element already sorbed by other components of the sorbent body; and (vi) facilitating the transfer of a toxic element to the active sorbing sites.

Inorganic fillers may be included for the purpose of, inter alia, reducing cost, and improving physical (coefficient of thermal expansion; modulus of rupture, e.g.); or chemical properties (water resistance; high temperature resistance; corrosion-resistance, e.g.) of the sorbent body. Such inorganic filler can be an oxide glass, oxide ceramic, or certain refractory materials. Non-limiting examples of inorganic fillers include: silica; alumina; zircon; zirconia; mullite; cordierite; refractory metals; and the like. In certain embodiments, the inorganic fillers are per se porous. A high porosity of the inorganic fillers can improve the mechanical strength of the sorbent body without unduly sacrificing the specific area. The inorganic filler may be distributed throughout the sorbent body. The inorganic filler may be present in the form of minuscule particles distributed in the sorbent body. Depending on the application of the sorbent body and other factors, in certain embodiments, the sorbent body may comprise, e.g., up to 50% by weight of inorganic filler, in certain other embodiments up to 40%, in certain other embodiments up to 30%, in certain other embodiments up to 20%, in certain other embodiments up to 10%.

In order to obtain a high specific surface area of the sorbent body, it is desired that, if inorganic fillers are included, such inorganic fillers in and of themselves are porous and contribute partly to the high specific area of the sorbent body. Inorganic fillers having specific surface area comparable to that of the activated carbon is usually difficult or costly to be included in the sorbent body. Therefore, along with the typical mechanical reinforcement such inorganic fillers would bring to the final sorbent body, it also tends to compromise the overall specific area of the sorbent body. This can be highly undesirable in some cases. A high surface area of the sorbent body usually means more active sites (including carbon sites capable of sorption of the toxic elements, sulfur capable of promoting or direct sorption of the toxic elements, and the metal catalyst capable of promoting sorption of the toxic elements) for the sorption of the toxic elements. It is further believed that close proximity of the three categories of active sorption sites in the sorbent body is conducive to the overall sorption capability.

The incorporation of large amounts of inorganic fillers dilutes the metal catalyst and sulfur in the carbon matrix, adding to the overall average distances between and among these three categories of active sites. Hence, in some embodiments, the sorbent body has a relative low percentage of inorganic filler (the remainder of the sorbent body being carbon, sulfur and metal catalyst). In certain embodiments, the sorbent body comprises less than 40%, less than 30%, less than 20%, less than 10%, less than 9%, less than 8%, less than 7%, less than 6%, less than 5%, less than 4%, less than 3%, less than 2%, less than 1%, or less than 0.5% by weight of inorganic filler. In one embodiment, the sorbent body comprises no inorganic filler. Sorbent bodies, which comprise lesser amounts of inorganic fillers, can lead to a more uniform distribution of mercury capture throughout the cross-section of the walls of the activated carbon matrix. Thus, in certain embodiments, the sorbent body comprises at least 90% by weight (in certain embodiments at least 91%, at least 92%, at least 93%, at least 94%, at least 95%, at least 96%, at least 97%, or at least 98%) of activated carbon, sulfur and the metal catalyst in total.

A further embodiment of the invention is a sorbent body comprising:

activated carbon;

sulfur, in any oxidation state, as elemental sulfur or in a chemical compound or moiety comprising sulfur; and a metal catalyst, in any oxidation state, as elemental metal or in a chemical compound or moiety comprising the metal;

wherein at least a portion of the metal catalyst is chemically bound to at least a portion of the sulfur.

As in other embodiments of sorbent bodies disclosed herein, at least a portion of the sulfur may be chemically bound to at least a portion of carbon in the activated carbon matrix. The sulfur and/or metal catalyst may be, in some embodiments, distributed throughout the activated carbon matrix. In other embodiments, the sulfur and/or metal catalyst is not distributed throughout the activated carbon matrix. The sorbent body of this and any other embodiment may comprise, for example, a metal sulfide such as manganese sulfide. The sorbent body of this embodiment may also have any one or more of the other characteristics mentioned for any other sorbent bodies of the invention, including characteristics of the activated carbon, of sulfur, and of the metal catalyst, that have been described earlier.

It is believed that embodiments of the sorbent bodies of the invention are capable of sorbing and removing toxic elements such as cadmium, mercury, chromium, lead, barium, beryllium, nickel, cobalt, vanadium, zinc, copper, manganese, antimony, silver, thallium, arsenic and selenium from fluids such as syngas streams and combustion flue gas streams. It has been found that the sorbent bodies are particularly effective in removing mercury from a flue gas stream. The removal capabilities of the sorbent materials with respect to a certain toxic element, e.g., mercury, are typically characterized by two parameters: initial removal efficiency and long term removal capacity. With respect to mercury, the following procedure is to be used to characterize the initial mercury removal efficiency and long term mercury removal capacity:

The sorbent body to be tested is loaded into a fixed bed through which a reference flue gas at 160° C. having a specific composition is passed at a space velocity of 7500 hr$^{-1}$. Concentrations of mercury in the gas stream are measured before and after the sorbent bed. At any given time, the instant mercury removal efficiency (Eff(Hg)) is calculated as follows:

$$Eff(Hg) = \frac{C_0 - C_1}{C_0} \times 100\%,$$

where $C_0$ is the total mercury concentration in $\mu g \cdot m^{-3}$ in the flue gas stream immediately before the sorbent bed, and $C_1$ is the total mercury concentration in $\mu g \cdot m^{-3}$ immediately after the sorbent bed. Initial mercury removal efficiency is defined as the average mercury removal efficiency during the first 1 (one) hour of test after the fresh test sorbent material is loaded. Typically, the mercury removal efficiency of a fixed sorbent bed diminishes over time as the sorbent bed is loaded with more and more mercury. Mercury removal capacity is defined as the total amount of mercury trapped by the sorbent bed per unit mass of the sorbent body material until the instant mercury removal efficiency diminishes to 90% under the above testing conditions. Mercury removal capacity is typically expressed in terms of mg of mercury trapped per gram of the sorbent material ($mg \cdot g^{-1}$).

An exemplary test reference flue gas (referenced as RFG1 herein) has the following composition by volume: $O_2$ 5%; $CO_2$ 14%; $SO_2$ 1500 ppm; NOx 300 ppm; HCl 100 ppm; Hg 20-25 $\mu g \cdot m^{-3}$; $N_2$ balance; wherein $NO_x$ is a combination of $NO_2$, $N_2O$ and NO; Hg is a combination of elemental mercury (Hg(0), 50-60% by mole) and oxidized mercury (40-50% by mole). In certain embodiments, the sorbent body has an initial mercury removal efficiency with respect to RFG1 of at least 90%, at least 91%, at least 92%, at least 95%, at least 97%, at least 98%, at least 99%, or of at least 99.5%.

In certain embodiments, the sorbent body advantageously has a high initial mercury removal efficiency of at least 90% for flue gases comprising $O_2$ 5%; $CO_2$ 14%; $SO_2$ 1500 ppm; $NO_x$ 300 ppm; Hg 20-25 $\mu g \cdot m^{-3}$, having high concentrations of HCl and low concentrations of HCl alike. By "high concentrations of HCl" is meant that HCl concentration in the gas to be treated is at least 20 ppm. By "low concentration of HCl" is meant that HCl concentration in the gas to be treated is at most 10 ppm. The sorbent body of certain embodiments has a high initial mercury removal efficiency of at least 90%, at least 91%, at least 93%, at least 95%, at least 96%, at least 98%, at least 99%, or at least 99.5% for a flue gas (referred to as RFG2) having the following composition: $O_2$ 5%; $CO_2$ 14%; $SO_2$ 1500 ppm; $NO_x$ 300 ppm; HCl 5 ppm; Hg 20-25 $\mu g \cdot m^{-3}$; $N_2$ balance. High mercury removal efficiency of these embodiments for low HCl flue gas is particularly advantageous compared to the prior art. In the prior art processes involving the injection of activated carbon powder, it is typically required that HCl be added to the flue gas in order to obtain a sufficient initial mercury removal efficiency. The embodiments presenting high mercury efficiency at low HCl concentration allows for the efficient and effective removal of mercury from a flue gas stream without the need of injecting HCl into the gas stream.

In certain embodiments, the sorbent body has a high initial mercury removal efficiency of at least 91% for flue gases comprising $O_2$ 5%; $CO_2$ 14%; $SO_2$ 1500 ppm; $NO_x$ 300 ppm; Hg 20-25 $\mu g \cdot m^{-3}$, having high concentrations of $SO_3$ (such as 5 ppm, 8 ppm, 10 ppm, 15 ppm, 20 ppm, 30 ppm, 40 ppm) and low concentrations of $SO_3$ alike (such as 0.01 ppm, 0.1 ppm, 0.5 ppm, 1 ppm, 2 ppm). By "high concentrations of $SO_3$" is meant that $SO_3$ concentration in the gas to be treated is at least 3 ppm by volume. By "low concentration of $SO_3$" is meant that $SO_3$ concentration in the gas to be treated is less than 3 ppm. The sorbent body of certain embodiments advantageously has a high initial mercury removal efficiency of at least 90%, at least 91%, at least 95%, at least 98%, or at least 99% for a flue gas (referred to as RFG3) having the following composition: $O_2$ 5%; $CO_2$ 14%; $SO_2$ 1500 ppm; $NO_x$ 300 ppm; $SO_3$ 5 ppm; Hg 20-25 $\mu g \cdot m^{-3}$; $N_2$ balance. High mercury removal efficiency of certain embodiments for high $SO_3$ flue gas is particularly advantageous compared to the prior art. In the prior art processes involving the injection of activated carbon powder, it is typically required that $SO_3$ be removed from the flue gas in order to obtain a sufficient initial mercury removal efficiency. The embodiments presenting high mercury efficiency at high $SO_3$ concentration allows for the efficient and effective removal of mercury from a flue gas stream without the need of prior removal of $SO_3$ from the gas stream.

According to certain embodiments, the sorbent body has a Hg removal capacity of 0.05 $mg \cdot g^{-1}$ with respect to RFG1, in certain embodiments of at least 0.10 $mg \cdot g^{-1}$, at least 0.15 $mg \cdot g^{-1}$, at least 0.20 $mg \cdot g^{-1}$, at least 0.25 $mg \cdot g^{-1}$, at least 0.30 $mg \cdot g^{-1}$, at least 0.50 $mg \cdot g^{-1}$, at least 1.0 $mg \cdot g^{-1}$, least 2.0 $mg \cdot g^{-1}$, or at least 3.0 $mg \cdot g^{-1}$ or with respect to RFG1.

According to certain embodiments, the sorbent body has an Hg removal capacity of 0.05 $mg \cdot g^{-1}$ with respect to RFG2, in certain embodiments of at least 0.10 $mg \cdot g^{-1}$, at least 0.15 $mg \cdot g^{-1}$, at least 0.20 $mg \cdot g^{-1}$, at least 0.25 $mg \cdot g^{-1}$, at least 0.30 $mg \cdot g^{-1}$, at least 0.50 $mg \cdot g^{-1}$, at least 1.0 $mg \cdot g^{-1}$, least 2.0 $mg \cdot g^{-1}$, or at least 3.0 $mg \cdot g^{-1}$ with respect to RFG2. Thus, the sorbent bodies according to these embodiments have a high mercury removal capacity with respect to low HCl flue gas streams. This is particularly advantageous compared to prior art mercury abatement processes.

According to certain embodiments, the sorbent body has an Hg removal capacity of 0.05 $mg \cdot g^{-1}$ with respect to RFG3, in certain embodiments of at least 0.10 $mg \cdot g^{-1}$, at least 0.15 $mg \cdot g^{-1}$, at least 0.20 $mg \cdot g^{-1}$, at least 0.25 $mg \cdot g^{-1}$, at least 0.30 $mg \cdot g^{-1}$, at least 0.50 $mg \cdot g^{-1}$, at least 1.0 $mg \cdot g^{-1}$, least 2.0 $mg \cdot g^{-1}$, or at least 3.0 $mg \cdot g^{-1}$ with respect to RFG3. Thus, the sorbent bodies according to these embodiments have a high mercury removal capacity with respect to high $SO_3$ flue gas streams. This is particularly advantageous compared to the prior art mercury abatement processes.

A further embodiment of the invention is thus any sorbent body described herein, wherein the sorbent body has an initial mercury removal efficiency of at least 90% with respect to RFG1, RFG2 and/or RFG3, or wherein the sorbent body has a mercury removal capacity of at least 0.05 $mg \cdot g^{-1}$ with respect to RFG1, RFG2 and/or RFG3.

In view of the above, an embodiment of the invention is a sorbent body comprising:

activated carbon;

sulfur, in any oxidation state, as elemental sulfur or in a chemical compound or moiety comprising sulfur; and a metal catalyst, in any oxidation state, as elemental metal or in a chemical compound or moiety comprising the metal;

wherein the sorbent body has an initial mercury removal efficiency of at least 90% with respect to RFG1, RFG2 and/or RFG3. For instance, the sorbent body may have an initial mercury removal efficiency of at least 91%, at least 95%, at least 98% or at least 99% with respect to RFG1, RFG2 and/or RFG3. The sulfur and/or metal catalyst may be, in some embodiments, distributed throughout the activated carbon matrix. In other embodiments, the sulfur and/or metal catalyst is not distributed throughout the activated carbon matrix. The sorbent body of this embodiment may also have any one or more of the other characteristics mentioned for any other sorbent bodies of the invention, including characteristics of the activated carbon, of sulfur, and of the metal catalyst, that have been described earlier.

A further embodiment of the invention is a sorbent body comprising:

activated carbon;

sulfur, in any oxidation state, as elemental sulfur or in a chemical compound or moiety comprising sulfur; and a metal catalyst, in any oxidation state, as elemental metal or in a chemical compound or moiety comprising the metal;

wherein the sorbent body has a mercury removal capacity of at least 0.05 mg·g$^{-1}$ with respect to RFG1, RFG2 and/or RFG3. For instance, the sorbent body may have a mercury removal capacity of at least 0.10 mg·g$^{-1}$, at least 0.15 mg·g$^{-1}$, at least 0.20 mg·g$^{-1}$, at least 0.25 mg·g$^{-1}$, at least 0.30 mg·g$^{-1}$, at least 0.50 mg·g$^{-1}$, at least 1.0 mg·g$^{-1}$, least 2.0 mg·g$^{-1}$, or at least 3.0 mg·g$^{-1}$ with respect to RFG1, RFG2 and/or RFG3. The sulfur and/or metal catalyst may be, in some embodiments, distributed throughout the activated carbon matrix. In other embodiments, the sulfur and/or metal catalyst is not distributed throughout the activated carbon matrix. The sorbent body of this embodiment may also have any one or more of the other characteristics mentioned for any other sorbent bodies of the invention, including characteristics of the activated carbon, of sulfur, and of the metal catalyst, that have been described earlier.

Another aspect of the invention is a method for the removal of a toxic element from a fluid, which comprises contacting the fluid containing the toxic element with a sorbent body according to the invention. Toxic elements include cadmium, mercury, chromium, lead, barium, beryllium, nickel, cobalt, vanadium, zinc, copper, manganese, antimony, silver, thallium, arsenic and selenium, any of which may be in any oxidation state and may be in elemental form or in a chemical compound comprising the element. The sorbent bodies may be used, for instance, for treating fluid streams, including gas streams and fluid streams comprising toxic elements, such as arsenic, cadmium, mercury and/or selenium, for abating them. Such processes typically comprise a step of placing the sorbent body in the fluid stream. Such treatment process is particularly advantageous for abating mercury from the fluid stream.

Due to their ability to remove elemental mercury from fluids, a particularly advantageous embodiment of the process comprises placing the sorbent bodies in a gas stream comprising mercury wherein at least 10%, at least 20%, at least 30%, at least 40%, at least 50%, at least 60% or at least 70% by mole of the mercury is in elemental state.

Due to their ability to remove mercury from fluids even if a gas stream comprises HCl at a very low level, a particularly advantageous embodiment of the process comprises placing the sorbent bodies in a gas stream comprising mercury and HCl at a HCl concentration of lower than 50 ppm by volume, lower than 40 ppm, lower than 30 ppm, lower than 20 ppm, or lower than 10 ppm.

Due to their ability to remove mercury from fluids even if a gas stream comprises SO$_3$ at a high level, a particularly advantageous embodiment of the process comprises placing the sorbent bodies in a gas stream comprising mercury and SO$_3$ at a SO$_3$ concentration of at least 3 ppm by volume, in certain embodiments higher than 5 ppm, higher than 8 ppm, higher than 10 ppm, or higher than 20 ppm.

A further aspect of the invention is a process for making a sorbent body, comprising:

(A) providing a batch mixture body formed of a batch mixture material comprising a carbon-source material, a sulfur-source material, a metal catalyst-source material and an optional filler material, wherein the metal catalyst-source material is substantially homogeneously distributed in the mixture;

(B) carbonizing the batch mixture body; and (C) activating the carbonized batch mixture body.

In certain embodiments, the carbon-source material comprises: synthetic carbon-containing polymeric material; activated carbon powder; charcoal powder; coal tar pitch; petroleum pitch; wood flour; cellulose and derivatives thereof; natural organic materials such as wheat flour; wood flour, corn flour, nut-shell flour; starch; coke; coal; or mixtures or combinations of any two or more of these. All these materials contain certain components comprising carbon atoms in its structure units on a molecular level that can be at least partly retained in the final activated carbon matrix of the sorbent body. According to certain embodiments the carbon-source material comprises a phenolic resin or a resin based on furfuryl alcohol.

In one embodiment, the synthetic polymeric material can be a synthetic resin in the form of a solution or low viscosity liquid at ambient temperatures. Alternatively, the synthetic polymeric material can be a solid at ambient temperature and capable of being liquefied by heating or other means. Examples of useful polymeric carbon-source materials include thermosetting resins and thermoplastic resins (e.g., polyvinylidene chloride, polyvinyl chloride, polyvinyl alcohol, and the like). Still further, in one embodiment, relatively low viscosity carbon precursors (e.g., thermosetting resins) can be preferred, having exemplary viscosity ranges from about 50 to 100 cps. In another embodiment, any high carbon yield resin can be used. To this end, by high carbon yield is meant that greater than about 10% of the starting weight of the resin is converted to carbon on carbonization. In another embodiment, the synthetic polymeric material can comprise a phenolic resin or a furfural alcohol based resin such as furan resins. Phenolic resins can again be preferred due to their low viscosity, high carbon yield, high degree of cross-linking upon curing relative to other precursors, and low cost. Exemplary suitable phenolic resins are resole resin such as plyophen resin. An exemplary suitable furan liquid resin is Furcab-LP from QO Chemicals Inc., IN, U.S.A. An exemplary solid resin well suited for use as a synthetic carbon precursor is solid phenolic resin or novolak. Still further, it should be understood that mixtures of novolak and one or more resole resins can also be used as suitable polymeric carbon-source material. The phenolic resin may be pre-cured or uncured when mixed with other material to form the batch mixture material. Where the phenolic resin is pre-cured, the pre-cured material may comprise sulfur, metal catalyst or the optional inorganic filler pre-loaded. In certain embodiments, it is desired that a curable, uncured resin is included as part of the carbon-source material in the batch mixture material. Curable materials, thermoplastic or thermosetting, undergo certain reactions, such as chain propagation, crosslinking, and the like, to form a cured material with higher degree of polymerization when being subjected to cure conditions, such as mild heat treatment, irradiation, chemical activation, and the like.

In certain embodiments, organic binders typically used in extrusion and/or injection molding processes can be part of the carbon-source material as well. Exemplary binders that can be used are plasticizing organic binders such as cellulose ethers. Typical cellulose ethers include methylcellulose, ethylhydroxy ethylcellulose, hydroxybutyl-cellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Further, cellulose ethers such as methylcellulose and/or methylcellulose derivatives are especially suited as organic binders, with methylcellulose, hydroxypropyl methylcellulose, or combinations of these being preferred. An example methylcellulose binder is METHOCEL A, sold by the Dow Chemical Company. Example hydroxypropyl methylcellulose binders include METHOCEL E, F, J, K, also sold by the Dow Chemical Company. Binders in the METHCEL 310 Series, also sold by the Dow Chemical Company, can also be used in the context of the invention. METHOCEL A4M is an example binder for use with a RAM extruder. METHOCEL F240C is an example binder for use with a twin screw extruder.

Carbonizable organic fillers may be used as part of the carbon-source material in certain embodiments of the process. Exemplary carbonizable fillers include both natural and synthetic, hydrophobic and hydrophilic, fibrous and non-fibrous fillers. For example some natural fillers are soft woods, e.g., pine, spruce, redwood, etc.; hardwoods, e.g., ash, beech, birch, maple, oak, etc.; sawdust, shell fibers, e.g., ground almond shell, coconut shell, apricot pit shell, peanut shell, pecan shell, walnut shell, etc.; cotton fibers, e.g., cotton flock, cotton fabric, cellulose fibers, cotton seed fiber; chopped vegetable fibers, for example, hemp, coconut fiber, jute, sisal, and other materials such as corn cobs, citrus pulp (dried), soybean meal, peat moss, wheat flour, wool fibers, corn, potato, rice, tapiocas, etc. Some synthetic materials are regenerated cellulose, rayon fabric, cellophane, etc. One especially suited carbonizable fiber filler is cellulose fiber as supplied by International Filler Corporation, North Tonawanda, N.Y. This material has the following sieve analysis: 1-2% on 40 mesh (420 micrometers), 90-95% thru 100 mesh (149 micrometers), and 55-60% thru 200 mesh (74 micrometers). Some hydrophobic organic synthetic fillers are polyacrylonitrile fibers, polyester fibers (flock), nylon fibers, polypropylene fibers (flock) or powder, acrylic fibers or powder, aramid fibers, polyvinyl alcohol, etc. Such organic fiberous fillers may function in part as part of the carbon-source material, in part as mechanical property enhancer to the batch mixture body, and in part as pore-forming agents that would mostly vaporize upon carbonization.

Non-limiting examples of metal catalyst-source material include: alkali and alkaline earth halides, oxides and hydroxides; oxides, sulfides, and salts of vanadium, chromium, manganese, iron, cobalt, nickel, copper, zinc, niobium, molybdenum, silver, tungsten, and lanthanoids. The metallic elements in the metal catalyst-source materials can be at various valencies. For example, if iron is included in the metal catalyst-source material, it may be present at +3, +2 or 0 valencies or as mixtures of differing valencies, and can be present as metallic iron (0), FeO, $Fe_2O_3$, $Fe_3O_8$, FeS, $FeCl_2$, $FeCl_3$, $FeSO_4$, and the like. For another example, if manganese is present in the metal catalyst source, it may be present at +4, +2 or 0 valencies or mixtures of differing valences, and can be present as metallic manganese (0), MnO, $MnO_2$, MnS, $MnCl_2$, $MnCl_4$, $MnSO_4$, and the like.

According to certain embodiments the metal catalyst-source material is in a form selected from: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; or (iv) combinations and mixtures of two or more of (i), (ii) and (iii). According to certain embodiments of the process, the metal catalyst-source material is in a form selected from: (i) oxides, sulfides, sulfates, acetates and salts of manganese; (ii) oxides, sulfides and salts of iron; (iii) combinations of (i) and KI; (iv) combinations of (ii) and KI; and/or (v) mixtures and combinations of any two or more of (i), (ii), (iii) and (iv).

Non-limiting examples of sulfur-source material include: sulfur powder; sulfur-containing powdered resin; sulfides; sulfates; and other sulfur-containing compounds; or mixtures or combination of any two or more of these. Exemplary sulfur-containing compounds can include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, and mixtures thereof. When elemental sulfur powder is used, in one embodiment it can be preferred to have an average particle diameter that does not exceed about 100 micrometers. Still further, it is preferred in certain embodiments that the elemental sulfur powder has an average particle diameter that does not exceed about 10 micrometers.

Inorganic fillers are not required to be present in the batch mixture material. However, if present, the filler material can be, e.g.: oxide glass; oxide ceramics; or other refractory materials. Exemplary inorganic fillers that can be used include oxygen-containing minerals or salts thereof, such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g., wollastonite (calcium metasilicate), titanates, zirconates, zirconia, zirconia spinel, magnesium aluminum silicates, mullite, alumina, alumina trihydrate, boehmite, spinel, feldspar, attapulgites, and aluminosilicate fibers, cordierite powder, mullite; cordierite; silica; alumina; other oxide glass; other oxide ceramics; or other refractory material.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2-6 micrometers in diameter and about 20-50 micrometers in length. Additional examples of inorganic fillers are various carbides, such as silicon carbide, titanium carbide, aluminum carbide, zirconium carbide, boron carbide, and aluminum titanium carbide; carbonates or carbonate-bearing minerals such as baking soda, nahcolite, calcite, hanksite and liottite; and nitrides such as silicon nitride.

The batch mixture material may also optionally comprise forming aids. Exemplary forming aids can include soaps, fatty acids, such as oleic, linoleic acid, etc., polyoxyethylene stearate, etc. or combinations thereof. In one embodiment, sodium stearate is a preferred forming aid. Optimized amounts of the optional extrusion aid(s) will depend on the composition and binder. Other additives that are useful for improving the extrusion and curing characteristics of the batch are phosphoric acid and oil. Phosphoric acid improves the cure rate and increases adsorption capacity. If included, it is typically about 0.1% to 5 wt % in the batch mixture material. Still further, an oil addition can aid in extrusion and can result in increases in surface area and porosity. To this end, an optional oil can be added in an amount in the range from about 0.1 to 5 wt. % of the batch mixture material. Exemplary oils that can be used include petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oils are 3 in 1 oil from 3M Co., or 3 in 1 household oil from Reckitt and Coleman Inc., Wayne, N.J. Other useful oils can include synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, soyabean oil etc. are also useful. Especially suited are oils having a viscosity of about 10 to 300 cps, and preferably about 10 to 150 cps.

The batch mixture material may also optionally comprise natural and/or synthetic pore-forming agents. The pore-forming agents may then be removed, for example, before or during carbonization and/or activation of the sorbent body. Removal of the pore-forming agents can impart certain characteristics to the pore structure of the sorbent body, such as voids of various sizes and dimensions.

In one embodiment, exemplary pore forming agents can include natural or synthetic pore-forming agents that, upon carbonization of the sorbent body, burn out and leave little or no residue behind in the sorbent body. Examples of such pore-forming agents include polymeric materials, such as polymeric beads. Example polymeric materials, such as polymeric beads, include polypropylene and polyethylene materials and beads. In one embodiment, the batch mixture material may comprise, as a pore-forming agent, polypropylene, polyester or acrylic powders or fibers that decompose in inert atmosphere at high temperature (>400° C.) to leave little or no residue.

Additional pore-forming agents include natural and synthetic starches. In some embodiments, when the pore-forming agent is water soluble, such as a starch, the pore-forming agent may be removed after curing the sorbent body via water dissolution before carbonization. In another embodiment, a suitable pore-forming agent can form macropores due to particle expansion. For example, intercalated graphite, which contains an acid such as hydrochloric acid, sulfuric acid or nitric acid, will form macropores when heated, due to the resulting expansion of the acid. Still further, macropores can also be formed by dissolving certain fugitive materials. For example, baking soda, calcium carbonate or limestone particles having a particle size corresponding to desired pore size can be extruded with carbonaceous materials to form monolithic sorbents. Baking soda, calcium carbonate or limestone forms water soluble oxides during the carbonization and activation processes, which can subsequently be leached to form macropores by soaking the monolithic sorbent in water.

In order to obtain a distribution of a metal catalyst throughout the final sorbent body, it is highly desired that the carbon-source materials and the metal catalyst-source materials are intimately mixed to form the batch mixture material. To that end, it is desired in certain embodiments that the various source materials are provided in the form of fine powders, or solutions if possible, and then mixed intimately by using an effective mixing equipment. When powders are used, they are provided in certain embodiments with average size not larger than 100 μm, in certain other embodiments not larger than 10 μm, in certain other embodiments not larger than 1 μm.

Various equipment and processes may be used to form the batch mixture material into a desired shape of the batch mixture body. For example, extrusion, injection molding (include reactive injection molding), compression molding, casting, pressing, or rapid prototyping may be used to shape the batch mixture body. The body may be cured as it is being shaped, for example, when shaped by injection molding or compression molding. Alternatively, the body may be cured after it is shaped, for example, when shaped by extrusion, casting, or rapid prototyping. According to some embodiments, the extruded batch mixture or cured batch mixture body takes the shape of a monolithic honeycomb having a plurality of channels Extrusion is especially preferred in certain embodiments for forming the batch mixture material into a desired shape of the batch mixture body. Extrusion can be done by using standard extruders (ram extruder, single-screw, double-screw, and the like) and custom extrusion dies, to make sorbent bodies with various shapes and geometries, such as honeycombs, pellets, rods, spaghetti, and the like. Extrusion is particularly effective for making monolithic honeycomb bodies having a plurality of empty channels that can serve as fluid passageways. Extrusion is advantageous in that it can achieve a highly intimate mixing of all the source materials as well during the extrusion process.

Molds of various shapes and dimensions may also be used for shaping the batch material through injection molding, compression molding and casting, all of which are well-known shaping techniques. Rapid prototyping, the automatic construction of physical objects using solid freeform fabrication, may also be used to shape the batch material. One advantage of rapid prototyping is that it may be used to create virtually almost any shape or geometric feature. Rapid prototyping comprises obtaining a virtual design, for example a computer aided design, converting the design into virtual thin horizontal cross sections, then creating each cross section of the design in physical space, one after the next, until the shape is completed. One embodiment includes obtaining a virtual design of a shaped batch material, converting the design into virtual thin horizontal cross sections, and creating each cross section in physical space from the batch material. One example of rapid prototyping is 3D printing.

In certain embodiments, it is desired that the batch mixture material comprises an uncured curable material. In those embodiments, upon forming of the batch mixture body, the sorbent body is typically subjected to a curing condition, e.g., heat treatment, such that the curable component cures, and a cured batch mixture body forms as a result. The cured batch mixture body tends to have better mechanical properties than its non-cured predecessor, and thus handles better in downstream processing steps. Moreover, without the intention or necessity to be bound by any particular theory, it is believed that the curing step can result in a polymer network having a carbon backbone, which can be conducive to the formation of carbon network during the subsequent carbonization and activation steps. In certain embodiments the curing is generally performed in air at atmospheric pressures and typically by heating the formed batch mixture body at a temperature of from 70° C. to 200° C. for about 0.5 to about 5.0 hours. In certain embodiments, the batch mixture body is heated from a low temperature to a higher temperature in stages, for example, from 70° C., to 90° C., to 125° C., to 150° C., each temperature being held for a period of time. Alternatively, when using certain precursors, (e.g., furfuryl alcohol or furan resins) curing can also be accomplished by adding a curing additive such as an acid additive at room temperature. The curing can, in one embodiment, serve to retain the uniformity of the metal catalyst distribution in the carbon.

After formation of the batch mixture body, drying thereof, or optional curing thereof, the shaped body is subjected to a carbonization step. For example, the batch mixture body (cured or uncured) may be carbonized by subjecting it to an elevated carbonizing temperature in an $O_2$-depleted atmosphere. The carbonization temperature can range from 600 to 1200° C., in certain embodiments from 700 to 1000° C. The carbonizing atmosphere can be inert, comprising mainly a non reactive gas, such as $N_2$, Ne, Ar, mixtures thereof, and the like. At the carbonizing temperature in an $O_2$-depleted atmosphere, the organic substances contained in the batch mixture body decompose to leave a carbonaceous residue. As can be expected, complex chemical reactions take place in this high-temperature step. Such reactions can include, inter alia:

(i) decomposition of the carbon-source materials to leave a carbonaceous body;
(ii) decomposition of the metal catalyst-source materials;
(iii) decomposition of the sulfur-source materials;
(iv) reactions between the sulfur-source materials and the carbon-source materials;

(v) reactions between the sulfur-source materials and carbon;

(vi) reactions between the sulfur-source materials and metal catalyst-source materials;

(vii) reactions between the metal catalyst-source materials and carbon-source materials; and (viii) reactions between the metal catalyst-source materials and carbon.

The net effect can include, inter alia: (1) re-distribution of the metal catalyst-source material and/or the metal catalyst; (2) re-distribution of sulfur; (3) formation of elemental sulfur from the sulfur-source material (such as sulfates, sulfites, and the like); (4) formation of sulfur-containing compounds from the sulfur-source material (such as elemental sulfur); (5) formation of metal catalyst in oxide form; (6) formation of metal catalyst in sulfide form; (7) reduction of part of the metal catalyst-source materials. Part of the sulfur (especially those in elemental state), and part of the metal catalyst-source material (such as KI) may be swept away by the carbonization atmosphere during carbonization.

The result of the carbonization step is a carbonaceous body with sulfur and metal catalyst distributed therein. However, this carbonized batch mixture body typically does not have the desired specific surface area for an effective sorption of toxic elements. To obtain the final sorbent body with a high specific surface area, the carbonized batch mixture body is further activated. The carbonized batch mixture body may be activated, for example, in a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas, for example, at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. Utilizing a combination of nitrogen and $CO_2$, for example, may result in cost savings. A $CO_2$ and nitrogen mixture may be used, for example, with $CO_2$ content as low as 2% or more. Typically a mixture of $CO_2$ and nitrogen with a $CO_2$ content of 5-50% may be used to reduce process costs. The activating temperature can range from 600° C. to 1000° C., in certain embodiments from 600° C. to 900° C. During this step, part of the carbonaceous structure of the carbonized batch mixture body is mildly oxidized:

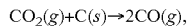
$$CO_2(g)+C(s)\rightarrow 2CO(g),$$

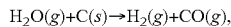
$$H_2O(g)+C(s)\rightarrow H_2(g)+CO(g),$$

resulting in the etching of the structure of the carbonaceous body and formation of an activated carbon matrix defining a plurality of pores on nanoscale and microscale. The activating conditions (time, temperature and atmosphere) can be adjusted to produce the final product with the desired specific area and composition. Similar to the carbonizing step, due to the high temperature of this activating step, complex chemical reactions and physical changes occur. It is highly desired that at the end of the activation step, the metal catalyst is distributed throughout the activated carbon matrix. It is highly desired that at the end of the activation step, the metal catalyst is distributed substantially homogeneously throughout the activated carbon matrix. It is highly desired that at the end of the activation step, the metal catalyst is present on at least 30%, at least 40%, at least 50%, at least 60%, or at least 80% of the wall surface area of the pores. It is highly desired that at the end of the activation step, sulfur is distributed throughout the activated carbon matrix. It is highly desired that at the end of the activation step, sulfur is distributed substantially homogeneously throughout the activated carbon matrix. It is highly desired that at the end of the activation step, sulfur is present on at least 30%, at least 40%, at least 50%, at least 60%, or at least 80% of the wall surface area of the pores.

According to certain embodiments the batch mixture material is selected such after activation, the sorbent body comprises less than 20% by weight of inorganic materials other than carbon, sulfur, and the metal catalyst (in certain embodiments less than 10%, in certain other embodiments less than 5%).

According to certain embodiments, the batch mixture material is selected such that, after activation, the sorbent body comprises from 30%-50% by weight of inorganic materials other than carbon, sulfur, and the metal catalyst, based on the total weight of carbon, sulfur, and the metal catalyst.

In certain embodiments of the process of the invention, all metal catalyst-source materials and all sulfur-source materials are included into the batch mixture body by in-situ forming, such as in-situ extrusion, casting, and the like. This process has the advantages of, inter alia: (a) avoiding a subsequent step (such as impregnation) of loading a metal catalyst and/or sulfur onto the activated carbon body, thus potentially reducing process steps, increasing overall process yield, and reducing process costs; (b) obtaining a more homogeneous distribution of active sorption sites (metal catalyst and sulfur) in the sorbent body than what is typically obtainable by impregnation; and (c) obtaining a durable and robust fixation of the metal catalyst and sulfur in the sorbent body, which can withstand the flow of the fluid stream to be treated for a long service period. Impregnation can result in preferential distribution of impregnated species (such as metal catalyst and sulfur) on external cell walls, wall surface of large pores (such as those on the micrometer scale). Loading of impregnated species onto a high percentage of the wall surfaces of the nanoscale pores can be time-consuming and difficult. Most of the surface area of activated carbon having high specific area of from 400 to 2000 $m^2$—$g^{-1}$ are contributed by the nanoscale pores. Thus, it is believed that it is difficult for a typical impregnation step to result in loading of the impregnated species onto a majority of the specific area of such activated carbon material. Moreover, it is believed that a typical impregnation step can result in a thick, relatively dense layer of the impregnated species on the external cell walls and/or wall surface of large pores, which blocks the fluid passageways into or out of the smaller pores, effectively reducing the sorptive function of the activated carbon. Still further, it is believed that the fixation of the impregnated species in a typical impregnation step in the sorbent body is mainly by relatively weak physical force, which may be insufficient for prolonged use in fluid streams.

Nonetheless, in certain embodiments, it is not necessary that all the metal catalyst and/or sulfur is distributed throughout the activated carbon matrix, let alone substantially homogeneously. In these embodiments, not all of the metal catalyst-source materials and sulfur-source materials are formed in situ into the batch mixture body. It is contemplated that, after the activation step, a step of impregnation of certain metal catalysts and/or sulfur may be carried out. Alternatively, after the activated step, a step of treating the activated body by a sulfur-containing and/or metal catalyst-containing atmosphere may be carried out. Such post-activation loading of metal catalyst is especially useful for metals that cannot withstand the carbonization and/or carbonization steps, such as those based on organometallic compounds, e.g., iron acetylacetonate.

Once the activated sorbent body of the invention is formed, it may be subjected to post-finishing steps, such as pellitizing, grinding, assembling by stacking, and the like. Sorbent bodies of various shapes and compositions of the present invention may then be loaded into a fixed bed which will be placed into the fluid stream to be treated.

Another aspect of the invention is an extruded batch mixture body comprising:

(I) a carbon-source material comprising an uncured, curable polymeric resin;
(II) particles of sulfur-containing material;
(III) a metal catalyst, either in elemental form or in a chemical compound comprising the metal;

wherein the metal catalyst is distributed substantially homogeneously in the material forming the extruded batch mixture body.

According to certain embodiments of the extruded batch mixture body of the invention, the particles of sulfur-containing material are distributed substantially homogeneously in the material forming the extruded batch mixture body.

According to certain embodiments of the extruded batch mixture body of the invention, the sulfur-containing material comprises at least 50% by mole of elemental sulfur.

According to certain embodiments of the extruded batch mixture body of the invention, the sulfur-containing material comprises elemental sulfur, sulfates, sulfites, sulfides, $CS_2$, and other sulfur-containing compounds.

According to certain embodiments of the extruded batch mixture body of the invention, the extruded batch mixture further comprises:

(IV) a binder material; and/or
(V) an inorganic filler material; and/or
(VI) a lubricant.

According to certain embodiments, the extruded batch mixture comprises less than 20% by weight of inorganic material other than carbon, sulfur-containing inorganic material, water and the metal catalyst, in certain embodiments less than 10%, in certain other embodiments less than 5%.

According to certain embodiments, the extruded batch mixture comprises from 20% to 50% by weight of an inorganic material other than carbon, sulfur-containing inorganic material, water and the metal catalyst. In certain embodiments, the material is a heat-resistant inorganic material that is chemically stable at 800° C., in certain other embodiments at 1000° C.

According to certain embodiments, the extruded batch mixture comprises a heat-resistant inorganic material selected from cordierite, mullite, silica, alumina, other oxide glass, other oxide ceramic, other refractory materials, and mixtures and combinations thereof. According to certain embodiments, the heat-resistant inorganic material comprises microscale pores.

The present invention is further illustrated by the following non-limiting examples.

EXAMPLES

Example 1

An extrusion composition was formulated with 46% liquid phenolic resole resin, 1% lubricating oil, 13% cordierite powder, 9% sulfur powder, 7% iron acetylacetonate, 18% cellulose fiber, 5% Methocel binder and 1% sodium stearate. This mixture was compounded and then extruded. The extruded honeycomb was then dried and cured in air at 150° C. followed by carbonization in nitrogen and activation in carbon dioxide. The activated carbon honeycomb samples were then tested for the mercury removal capability. The test was done at 160° C. with 22 $\mu g \cdot m^{-3}$ inlet elemental mercury concentration. The carrier gas for mercury contained $N_2$, $SO_2$, $O_2$ and $CO_2$. The gas flow rate was 750 ml/minute. The total mercury removal efficiency was 86% while elemental mercury removal efficiency was 100%.

Example 2

Another extrusion composition was extruded similar to Example 1 but with 12% cordierite powder instead of 13% and the iron acetylacetonate at 4% and potassium iodide at 4% instead of 7% iron acetylacetonate. After activation these samples showed 90% total mercury removal and 100% elemental mercury removal. The presence of KI in the composition thus increased the efficiency.

Example 3

In this experiment the extrusion composition was 59% phenolic resole, 1% phosphoric acid, 1% oil, 9% sulfur powder, 3% iron oxide, 19% cellulose fiber, 7% methocel binder and 1% sodium stearate. These samples were extruded, cured carbonized, activated and tested as in Example 1 for mercury removal performance. The mercury removal efficiency was 87% and 97% for total and elemental mercury, respectively.

Example 4

In this experiment manganese oxide was used as a metal catalyst source with the composition of 6% $MnO_2$, 13% cordierite, 7% sulfur, 19% cellulose fiber, 5% methocel binder, 1% sodium stearate, 47% phenolic resole, 1% phosphoric acid and 1% oil. The mercury removal efficiency of the samples based on this composition was 92% and 98% for total and elemental mercury, respectively.

Example 5

In this example sulfur was added combined with manganese as MnS instead of as elemental sulfur. The composition was 15% cordierite, 10% MnS, 20% cellulose fiber, 5% methocel binder, 1% sodium stearate, 47% phenolic resole, and 1% oil.

On cure, carbonization and activation the mercury removal efficiency of these honeycombs was 84% and 93% for total and elemental mercury, respectively.

Example 6

The experiment of Example 5 was repeated but with molybdenum disulfide ($MoS_2$) in place of MnS. These samples gave mercury removal efficiency of 90% and 96% for total and elemental mercury, respectively.

These Examples show that the sorbent bodies of the invention can demonstrate high mercury removal efficiencies. It is expected that the sorbent bodies of the invention will also be useful for the sorption of other toxic elements such as cadmium, chromium, lead, barium, beryllium, nickel, cobalt, vanadium, zinc, copper, manganese, antimony, silver, thallium, arsenic and selenium from fluids such as flue gases as well as in coal gasification.

Example 7

In this experiment the extrusion composition was 14% charcoal, 47% phenol resin, 7% sulfur, 7% manganese oxide, 18% cellulose fiber, 5% mythical binder and 1% sodium separate. These samples were extruded, cured, carbonized and activated as in Example 1.

The samples were then tested for mercury removal capability. The test was done at 140° C. with 24 μg/m³ inlet elemental mercury concentration. The carrier gas for mercury contained $N_2$, HCl, $SO_2$, $NO_x$, $O_2$ and $CO_2$. The gas flow rate was 650 ml/minute. The mercury removal efficiency was 100% and 99% for both total and elemental mercury, respectively. See TABLE II below.

Example 8

In this example, the extrusion composition was 16% cured sulfur-containing phenol resin, 45% phenol resin, 8% sulfur, 7% manganese oxide, 18% cellulose fiber, 4% mythical binder and 1% sodium separate. These samples were extruded, cured, carbonized and activated as in Example 1. The activated carbon samples were tested as in Example 7. The mercury removal efficiency was 100% and 99% for total and elemental mercury, respectively. See TABLE II below. Thus both Examples 7 and 8 achieved excellent mercury removal results.

Various sorbent bodies comprising differing components were tested for mercury removal efficiency. Test results are listed in TABLE I below. In all tables and drawings in the present application, $Hg^0$ or Hg(0) means elemental mercury; $Hg^T$ or Hg(T) means total mercury, including elemental and oxidized mercury. Eff($Hg^0$) or Eff(Hg(0)) means the instant mercury removal efficiency with respect to elemental mercury, and Eff($Hg^T$) or Eff(Hg(T)) means instant mercury removal efficiency with respect to mercury at all oxidation states. Just as described above, Eff(Hg(x)) is calculated as follows:

$$Eff(HG(x)) = \frac{C_0 - C_1}{C_0} \times 100\%,$$

where $C_0$ is the inlet concentration of Hg(x), and $C_1$ is the outlet concentration of Hg(x), respectively, at a given test time.

Comparison of Sample Nos. C and D in TABLE I clearly shows that a sorbent material comprising MnS tends have higher performance if it also comprises elemental sulfur in the batch mixture material than if it does not comprise elemental sulfur in the batch mixture material.

FIG. 1 is a diagram comparing the mercury removal capability of a tested sample of a sorbent according to the present invention and a comparative sorbent over time. On the left vertical axis is the aggregate amount of mercury per unit mass (MSS, mg·g⁻¹) trapped by the tested samples of the tested sorbents. On the right vertical axis is instant mercury removal efficiency of the tested sorbents (Eff(Hg)), which is the instant total mercury removal efficiency measured and calculated according to the formula above. On the horizontal axis is the time the sample was exposed to the test gas. Part of the Eff(Hg) data in this figure are also presented in TABLE III below. The sorbent according to the present invention comprises sulfur, in-situ extruded $MnO_2$ as the metal catalyst source and about 45% by weight of cordierite as an inorganic filler. Sample 2.2 is a comparative sorbent comprising no in-situ extruded metal catalyst source, comparable amount of sulfur and cordierite, and impregnated $FeSO_4$ and KI. Curves 101 and 103 show the Eff(Hg) and MSS of the sorbent according to the present invention, respectively. Curves 201 and 203 show the Eff(Hg) and MSS of the comparative sorbent, respectively. As can be seen from this figure and the data of TABLE III, the sorbent did not show an abrupt drop of mercury removal efficiency even after 250 hours of exposure to a simulated flue gas comprising total mercury at about 20 μg·m⁻³, indicating a fairly large amount of mercury can be trapped by the sorbent material before it reaches saturation (or mercury break-through point). The curve 201 and data of TABLE III show that the comparative sorbent had an abrupt, continuous drop of instant mercury removal efficiency within 50 hours until about 70 hours when the test was terminated, indicating an early saturation of the sorbent. Curves 103 and 203 overlap to a certain extent at the early stage of test period, but 203 ends at about 69 hours.

FIG. 1 shows that the sorbent of this embodiment of the present invention, comprising in-situ extruded metal catalyst source, can have much higher mercury removal capability, especially on the long term, than sorbent having an impregnated metal catalyst sources. Without the intention or necessity to be bound by a particular theory, it is believed that the superior performance of the sorbent of the present invention is due to the more homogeneous distribution of the metal catalyst, and less blockage of the pores in the activated carbon matrix by the metal catalyst.

Figure 2:
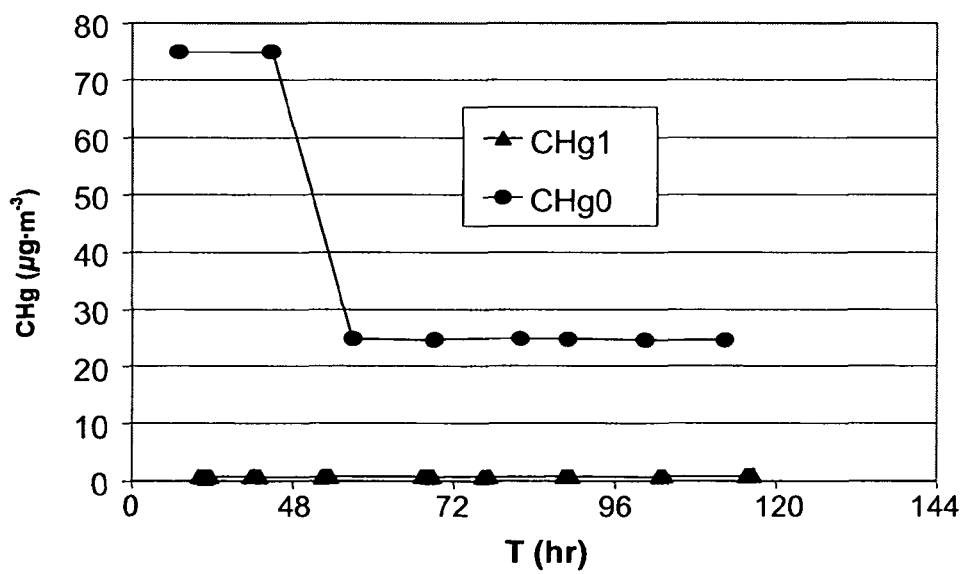
FIG. 2 is a diagram showing the inlet mercury concentration (CHg0) and outlet mercury concentration (CHg1) of a sorbent body according to one embodiment of the invention at various inlet mercury concentrations.

FIG. 2 is a diagram showing the inlet mercury concentration (CHg0) and outlet mercury concentration (CHg1) of sorbent bodies according to one embodiment of the present invention various inlet mercury concentrations. This diagram clearly indicates that the sorbent bodies of certain embodiments of the present invention can be used to remove mercury effectively at various mercury concentration (ranging from above 70 to about 25 μg·m⁻³).

Figure 3:
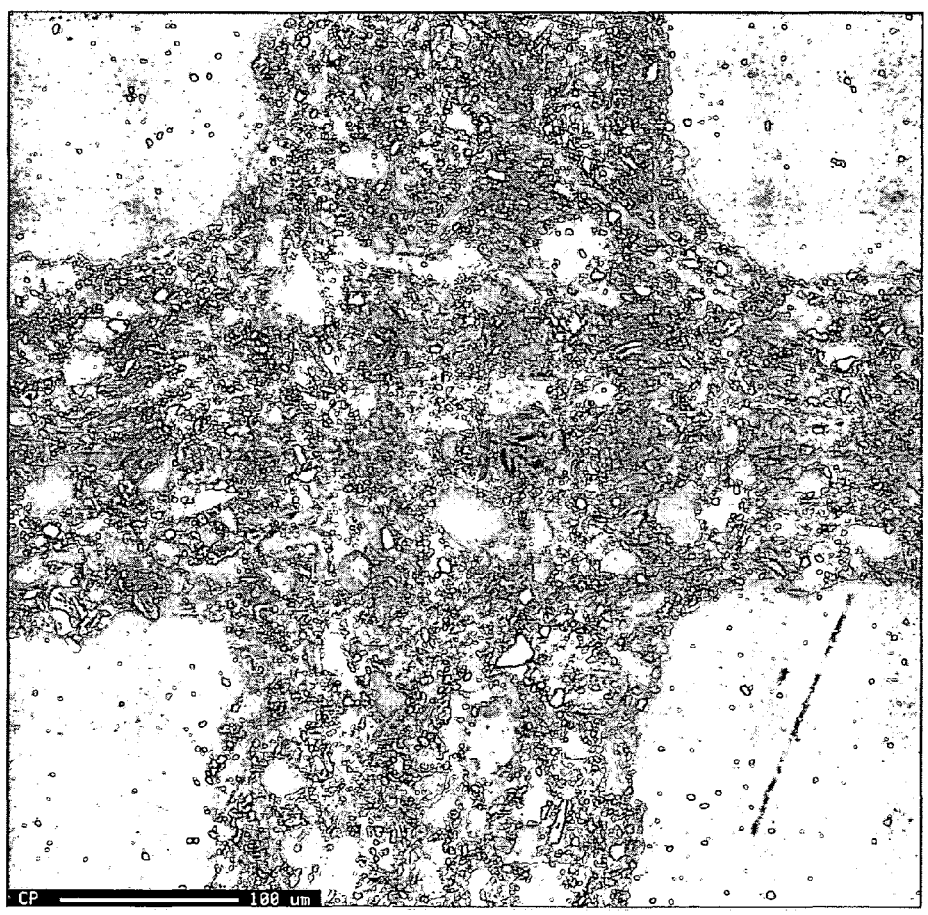
FIG. 3 is an SEM image of part of a cross-section of a sorbent body according to one embodiment of the invention comprising in-situ extruded metal catalyst.
Figure 4:
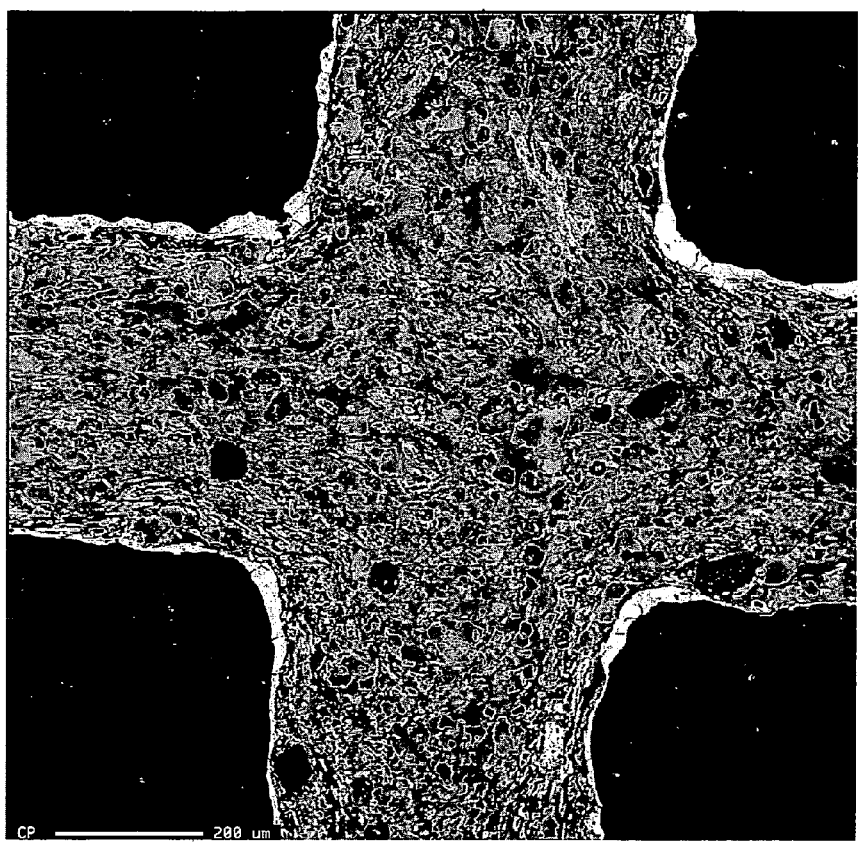
FIG. 4 is an SEM image of part of a cross-section of a comparative sorbent body comprising post-activation impregnated metal catalyst.

FIG. 3 is a SEM image of part of a cross-section of a sorbent body according to the present invention comprising in-situ extruded metal catalyst. From the image, preferential accumulation of metal catalyst or sulfur is not observed. FIG. 4 is a SEM image of part of a cross-section of a comparative sorbent body comprising post-activation impregnated metal catalyst. The clearly visible white layer of material on the cell wall is the impregnated metal catalyst. It is believed that this relatively dense layer of impregnated layer of metal catalyst can block the entrances into many macroscale and nanoscale pores inside the cell walls, reducing the overall performance of the comparative sorbent body.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| Sample No. | Metal catalyst-Source | Test Time (Hours) | $Hg^T$ Inlet Concentration ($\mu g \cdot m^{-3}$) | $Eff(Hg^0)$ (%) | $Eff(Hg^T)$ (%) |
|---|---|---|---|---|---|
| A | $MnO_2$ | 20 | 22 | 98 | 92 |
| B | $MoS_2$ | 24 | 22 | 96 | 90 |
| C | MnS (with elemental sulfur in batch) | 20 | 22 | 98 | 92 |
| D | MnS (without elemental sulfur in batch) | 19 | 22 | 93 | 84 |
| E | $Cr_2O_3$ | 24 | 22 | 98 | 88 |
| F | CuO and $Cu_2S$ | 19 | 22 | 97 | 90 |
| G | $Fe_2O_3$ | 20 | 22 | 97 | 87 |
| H | Iron Acetylacetonate (FeAT) | 19 | 22 | 100 | 87 |
| I | FeAT and KI | 20 | 22 | 100 | 90 |

TABLE II

| Example No. | Test Time (Hours) | Hg(T), Inlet Conc. ($\mu g \cdot m^{-3}$) | Hg(0) Removal Efficiency (%) | Hg(T) Removal Efficiency (%) |
|---|---|---|---|---|
| 7 | 72 | 24 | 99 | 100 |
| 8 | 72 | 22 | 99 | 100 |

TABLE III

| | Mercury removal efficiency (%) | | | | | | | | | | | | | | | | | | |
|---|---|---|---|---|---|---|---|---|---|---|---|---|---|---|---|---|---|---|---|
| | Time (Hr) aa | | | | | | | | | | | | | | | | | | |
| cc | 1 | 2 | 3 | 5 | 10 | 15 | 20 | 25 | 30 | 35 | 40 | 45 bb | 50 | 60 | 70 | 80 | 100 | 150 | 200 | 250 |
| 101 | 94 | 94 | 92 | 91 | 91 | 90 | 88 | 87 | 87 | 87 | 87 | 87 | 87 | 88 | 88 | 89 | 88 | 85 | 85 | 86 |
| 201 | 79 | 81 | 85 | 83 | 83 | 84 | 84 | 84 | 84 | 83 | 82 | 80 | 77 | 70 | — | — | — | — | — | — | aa: time (hour);
bb: mercury removal efficiency (%);
cc: Curve No. as shown in FIG. 1.

What is claimed is:

1. A sorbent body comprising:
   an activated carbon matrix comprising nanoscale pores having a diameter of less than or equal to 10 nm and microscale pores having a diameter of higher than 10 nm;
   sulfur, in any oxidation state, as elemental sulfur or in a chemical compound or moiety comprising sulfur; and
   a metal catalyst selected from sulfides of: vanadium, chromium, manganese, iron, cobalt, nickel, copper, zinc, niobium, molybdenum, silver, tungsten and lanthanoids;
   wherein the metal catalyst is homogenously distributed throughout the activated carbon matrix and is present on at least 50% of the wall surfaces of the nanoscale pores.

2. The sorbent body according to claim 1, wherein sulfur is essentially homogeneously distributed throughout the activated carbon matrix.

3. The sorbent body according to claim 1, wherein at least a portion of the metal catalyst is chemically bound to at least a portion of the sulfur.

4. The sorbent body according to claim 1, wherein at least a portion of the sulfur is chemically bound to at least a portion of carbon in the activated carbon matrix.

5. The sorbent body according to claim 1, wherein the metal catalyst will promote the removal of one or more of arsenic, cadmium, mercury and selenium from a fluid in contact with the sorbent body.

6. The sorbent body of claim 1 wherein the sorbent body has an initial mercury removal efficiency of at least 90% with respect to RFG1, RFG2 and/or RFG3.

7. The sorbent body of claim 1 wherein the sorbent body has a mercury removal capacity of at least 0.05 $mg \cdot g^{-1}$ with respect to RFG1, RFG2 and/or RFG3.

8. The according to claim 1 wherein the sulfur is elemental sulfur.

9. The sorbent body according to claim 1, which is in the form of a honeycomb monolith.

10. The sorbent body according to claim 1 wherein the metal catalyst is present on at least 75% of the wall surfaces of the nanoscale pores.

11. The sorbent body according to claim 1 wherein the sorbent body comprises an alkaline earth hydroxide.

12. A sorbent body comprising:
   an activated carbon matrix comprising nanoscale pores having a diameter of less than or equal to 10 nm and microscale pores having a diameter of higher than 10 nm;
   sulfur, in any oxidation state, as elemental sulfur or in a chemical compound or moiety comprising sulfur; and
   a metal catalyst selected from sulfides of: vanadium, chromium, manganese, iron, cobalt, nickel, copper, zinc, niobium, molybdenum, silver, tungsten and lanthanoids;
   wherein the metal catalyst and the sulfur are homogenously distributed throughout the activated carbon matrix, the metal catalyst and the sulfur both being present on at least 50% of the wall surfaces of the nanoscale pores.

13. A sorbent body according to claim 12, wherein at least a portion of the metal catalyst is chemically bound to at least a portion of the sulfur.

14. A sorbent body according to claim 12, wherein at least a portion of the sulfur is chemically bound to at least a portion of carbon in the activated carbon matrix.

15. A sorbent body according to claim 12 wherein the sorbent body comprises an alkaline earth hydroxide.

16. The sorbent body according to claim 12, which is in the form of a honeycomb monolith.

17. The sorbent body according to claim 12 wherein the metal catalyst is present on at least 75% of the wall surfaces of the nanoscale pores.

18. The sorbent body according to claim 12 wherein the sulfur is present on at least 75% of the wall surfaces of the nanoscale pores.

19. The sorbent body according to claim 9, wherein the honeycomb monolith has a plurality of channels.

20. The sorbent body according to claim 19, wherein a portion of the channels are plugged at one end of the sorbent body and another portion of the channels are plugged at the opposite end of the sorbent body.

21. The sorbent body according to claim 16, wherein the honeycomb monolith has a plurality of channels.

22. The sorbent body according to claim 21, wherein a portion of the channels are plugged at one end of the sorbent body and another portion of the channels are plugged at the opposite end of the sorbent body.

\* \* \* \* \*

UNITED STATES PATENT AND TRADEMARK OFFICE
CERTIFICATE OF CORRECTION

PATENT NO. : 8,741,243 B2  
APPLICATION NO. : 12/599896  
DATED : June 3, 2014  
INVENTOR(S) : Kishor Purushottam Gadkaree et al.

Page 1 of 1

It is certified that error appears in the above-identified patent and that said Letters Patent is hereby corrected as shown below:

Title page, item (75), Inventors: reads Anbo Liu, Panited Post, NY and should read Painted Post, NY.

Signed and Sealed this  
Eleventh Day of August, 2015

Michelle K. Lee  
*Director of the United States Patent and Trademark Office*